(12) United States Patent
Foskey et al.

(10) Patent No.: US 11,718,396 B2
(45) Date of Patent: Aug. 8, 2023

(54) ACTIVE SAIL BLADE

(71) Applicant: Bell Helicopter Textron Inc., Fort Worth, TX (US)

(72) Inventors: Christopher Edward Foskey, Keller, TX (US); Jeffrey Mark Bosworth, Flower Mound, TX (US)

(73) Assignee: Textron Innovations Inc., Providence, RI (US)

( * ) Notice: Subject to any disclaimer, the term of this patent is extended or adjusted under 35 U.S.C. 154(b) by 244 days.

(21) Appl. No.: 16/439,487

(22) Filed: Jun. 12, 2019

(65) Prior Publication Data

US 2020/0391860 A1    Dec. 17, 2020

(51) Int. Cl.
| | |
|---|---|
| *B64C 29/00* | (2006.01) |
| *B64C 11/18* | (2006.01) |
| *B64C 3/38* | (2006.01) |
| *B64C 11/28* | (2006.01) |
| *B64C 27/51* | (2006.01) |

(52) U.S. Cl.
CPC ............ *B64C 29/0033* (2013.01); *B64C 3/38* (2013.01); *B64C 11/18* (2013.01); *B64C 11/28* (2013.01); *B64C 27/51* (2013.01)

(58) Field of Classification Search
CPC ......... B64C 11/28; B64C 27/50; B64C 11/44; B64C 13/16; B64C 13/50; B64C 27/57; B64C 27/68; B64C 11/008; B64C 27/001; B64C 27/24

See application file for complete search history.

(56) References Cited

U.S. PATENT DOCUMENTS

| | | | |
|---|---|---|---|
| 6,821,090 B1 * | 11/2004 | Hassan ................... | B64C 23/04 416/42 |
| 8,376,264 B1 * | 2/2013 | Hong ...................... | B64C 27/30 244/7 A |
| 8,998,125 B2 * | 4/2015 | Hollimon ............ | B64C 29/0033 244/7 A |
| 9,701,406 B2 | 7/2017 | Robertson et al. | |
| 10,501,177 B2 * | 12/2019 | Tweedt .................. | B64C 39/08 |
| 2012/0292456 A1 | 11/2012 | Hollimon et al. | |
| 2016/0046369 A1 * | 2/2016 | Watkins ................... | B64C 5/02 244/7 A |
| 2016/0152329 A1 | 6/2016 | Tzeng et al. | |
| 2016/0244147 A1 * | 8/2016 | Arata ...................... | B64C 11/28 |
| 2017/0144746 A1 | 5/2017 | Schank et al. | |
| 2017/0217575 A1 * | 8/2017 | Welsh ..................... | B64C 19/00 |

FOREIGN PATENT DOCUMENTS

SE        1050584 A1 *  12/2011

\* cited by examiner

*Primary Examiner* — Richard Green
*Assistant Examiner* — Ashesh Dangol
(74) *Attorney, Agent, or Firm* — Fogarty LLP

(57) ABSTRACT

Embodiments are directed to systems and methods for deploying an outboard rotor blade of proprotor pylon to act as an extended lifting surface. Blade control actuators may provide primary rotor flight control as well as providing fold linkage actuation when fold locks are disengaged. During cruise flight, the blade control actuator may provide feathering inputs to the extended rotor blade, wherein the amplitude and frequency of feathering inputs are tuned to mitigate undesirable wing and fuselage dynamic modes thereby enhancing aircraft stability. The deployed rotor blades also improve the total lifting area of the aircraft, which may increase aircraft range and efficiency.

19 Claims, 16 Drawing Sheets

ACTIVE SAIL BLADE

BACKGROUND

Fixed-wing aircraft, such as airplanes, are capable of flight using wings that generate lift responsive to the forward airspeed of the aircraft, which is generated by thrust from one or more jet engines or propellers. The wings generally have an airfoil cross section that deflects air downward as the aircraft moves forward, generating the lift force to support the aircraft in flight. Fixed-wing aircraft, however, typically require a runway that is hundreds or thousands of feet long for takeoff and landing.

Unlike fixed-wing aircraft, vertical takeoff and landing (VTOL) aircraft do not require runways. Instead, VTOL aircraft are capable of taking off, hovering and landing vertically. One example of a VTOL aircraft is a helicopter, which is a rotorcraft having one or more rotors that provide lift and thrust to the aircraft. The rotors not only enable hovering and vertical takeoff and landing, but also enable forward, backward and lateral flight. These attributes make helicopters highly versatile for use in congested, isolated or remote areas. Helicopters, however, typically lack the forward airspeed of fixed-wing aircraft due to the phenomena of retreating blade stall and advancing blade compression.

Tiltrotor aircraft attempt to overcome this drawback by including a set of proprotors that can change their plane of rotation based on the operation being performed. Tiltrotor aircraft generate lift and propulsion using proprotors that are typically coupled to nacelles mounted near the ends of a fixed wing. The nacelles rotate relative to the fixed wing such that the proprotors have a generally horizontal plane of rotation for vertical takeoff, hovering and landing and a generally vertical plane of rotation while cruising in forward flight, wherein the fixed wing provides lift and the proprotors provide forward thrust. In this manner, tiltrotor aircraft combine the vertical lift capability of a helicopter with the speed and range of fixed-wing aircraft.

The wings, nacelles and other structural elements of tiltrotor aircraft are susceptible to moving or vibrating at different modes, especially as the mode of the proprotors is lowered due to increasing forward flight speed and air flow through the proprotor. These modal movements approximate a pitch-plunge, swim-like, or whirling movement that can be catastrophic if structural stability margins are exceeded. While adding structural stiffness to the wings and other portions of the tiltrotor aircraft can improve stability margins during forward flight, the addition of such structural stiffness comes with the drawback of adding weight to the tiltrotor aircraft, increasing the amount of lift needed to fly the tiltrotor aircraft, thereby consuming more fuel and reducing tiltrotor aircraft endurance. Passive damping systems may fail to adequately damp modal motions, may be complicated and may lack efficiency, particularly in light of the weight penalty associated with such systems. Accordingly, a need has arisen for a tiltrotor aircraft stability system that does not add superfluous weight to the tiltrotor aircraft, while still providing adequate damping of modes of the structural elements of the tiltrotor aircraft.

SUMMARY

Embodiments are directed to systems and methods for deploying an outboard rotor blade of proprotor pylon to act as an extended lifting surface. Blade control actuators may provide primary rotor flight control as well as providing fold linkage actuation when fold locks are disengaged. During cruise flight, the blade control actuator may provide feathering inputs to the extended rotor blade, wherein the amplitude and frequency of feathering inputs are tuned to mitigate undesirable wing and fuselage dynamic modes thereby enhancing aircraft stability. The deployed rotor blades also improve the total lifting area of the aircraft, which may increase aircraft range and efficiency.

In one embodiment, a tiltrotor aircraft comprises a fuselage, a wing attached to the fuselage, and a rotor system coupled to a first end of the wing. The rotor system is configured to move between a horizontal position and a vertical position during operation. The rotor system comprises a first rotor blade and one or more additional rotor blades that are operable to generate thrust when rotating. The first rotor blade is configured to remain in an extend position outboard of the wing when the additional rotor blades are in a folded position during flight.

The first rotor blade may be operable as a primary flight control, a secondary flight control, or an augmented flight control while in the extended position. The first rotor blade may be operable to provide a lift force on the aircraft while in the extended position.

The tiltrotor may further comprise a blade actuator coupled to the first rotor blade. The blade actuator is configured to move the first rotor blade to counter an undesired force acting on the aircraft. The undesired force may comprise, for example, a vibration or flutter.

The blade actuator may be configured to move the first rotor blade in response to a flight control input.

The tiltrotor may further comprise a feedback loop computing unit in communication with a blade actuator. The feedback loop computing unit is operable to control movement of the first rotor blade by the blade actuator. At least one sensor may be coupled to the aircraft and in data communication with the feedback loop computing unit. The at least one sensor is operable to detect at least one stability parameter of an aircraft structure. The feedback loop computing unit is operable to determine a frequency and a phase angle of a mode of the aircraft structure based on the at least one stability parameter. The feedback loop computing unit is operable to send a command to oscillate the first rotor blade at a dampening frequency having substantially the same frequency of the mode of the aircraft structure and having a different phase angle of the mode of the aircraft structure.

The tiltrotor aircraft may further comprise a second rotor system coupled to a second end the wing and configured to move between a horizontal position and a vertical position during operation. The second rotor system comprises a first rotor blade and one or more additional rotor blades and operable to generate thrust when rotating. The first rotor blade on the second rotor system is configured to remain in an extend position outboard of the wing when the additional rotor blades on the second rotor system are in a folded position during flight.

The tiltrotor aircraft may further comprise a second wing attached to the fuselage. A third and a fourth rotor system are coupled to first and second ends the second wing. The third and fourth rotor systems are configured to move between a horizontal position and a vertical position during operation. The third and fourth rotor systems each comprising a plurality of rotor blades operable to generate thrust when rotating. A first rotor blade on each of the third and fourth rotor systems may be configured to remain in an extend position outboard of the wing when the additional rotor blades on the third and fourth rotor systems are in a folded position during flight.

BRIEF DESCRIPTION OF THE DRAWINGS

Figure 1A:
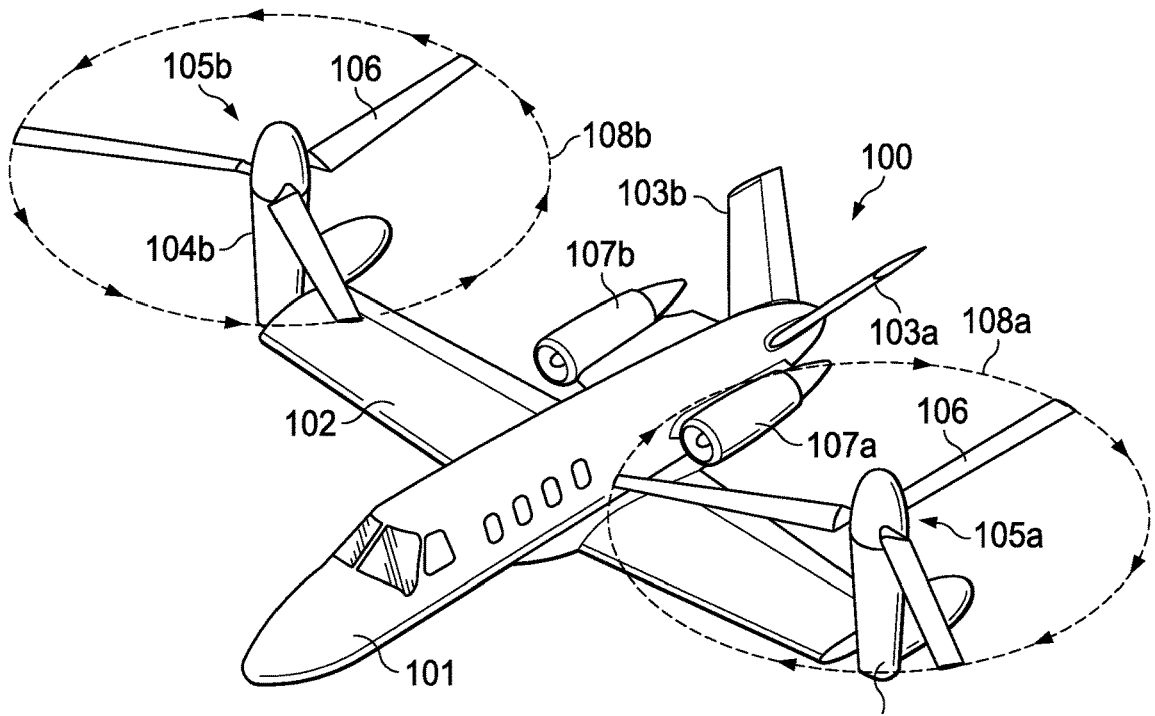

Having thus described the invention in general terms, reference will now be made to the accompanying drawings, which are not necessarily drawn to scale, and wherein:

FIG. 1A illustrates a tiltrotor aircraft in VTOL or helicopter flight mode.

Figure 1B:
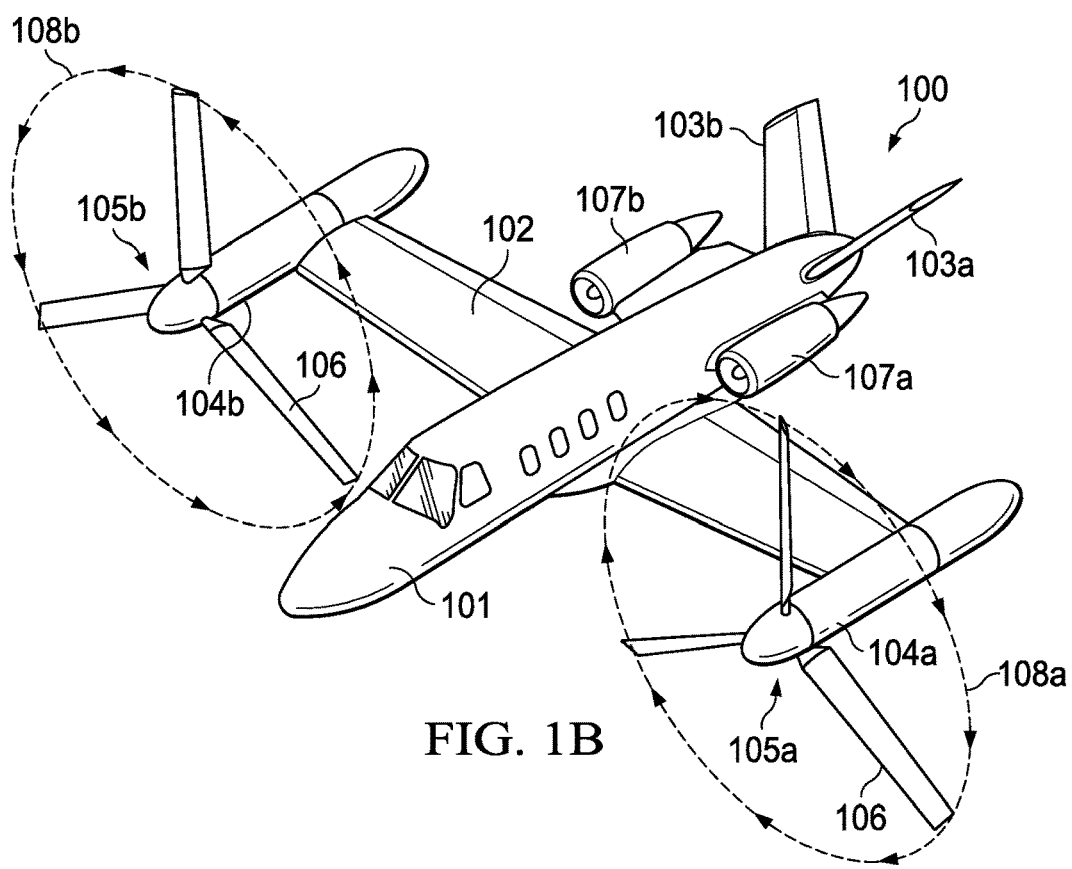

FIG. 1B illustrates the tiltrotor aircraft of FIG. 1A in proprotor forward flight mode.

Figure 1C:
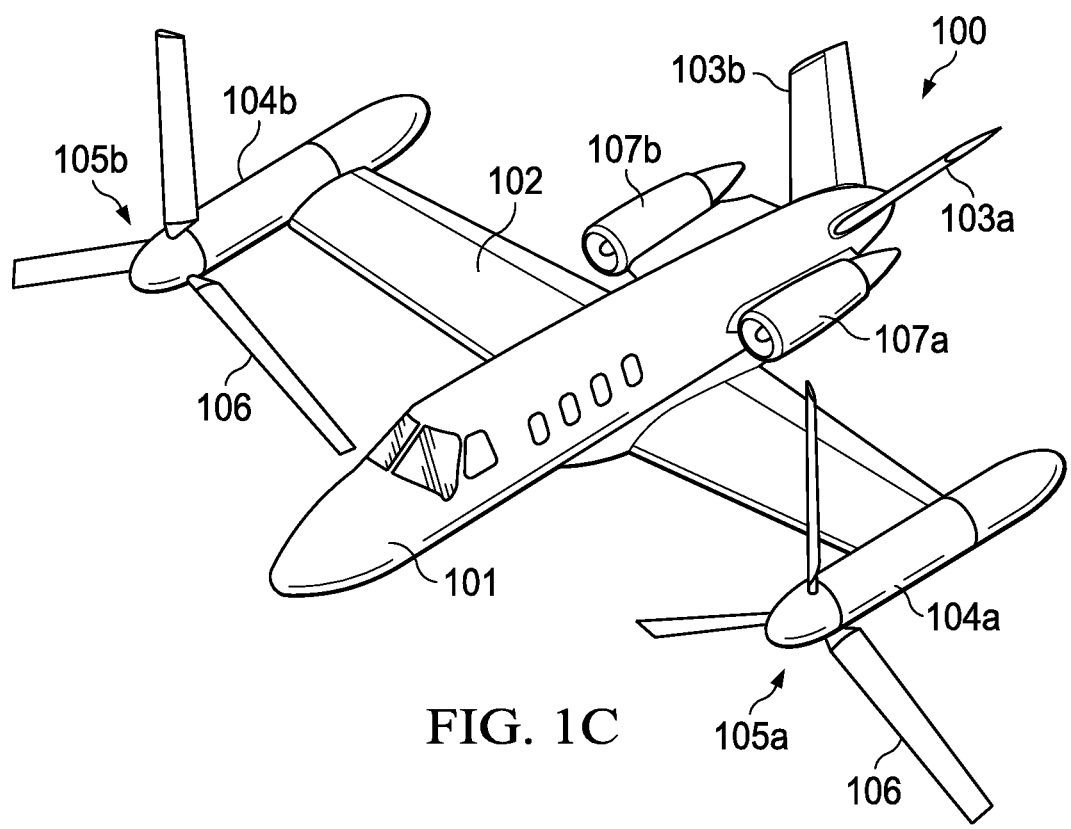

FIG. 1C illustrates the tiltrotor aircraft of FIG. 1B wherein proprotor blades on the proprotor assemblies have been feathered.

Figure 1D:
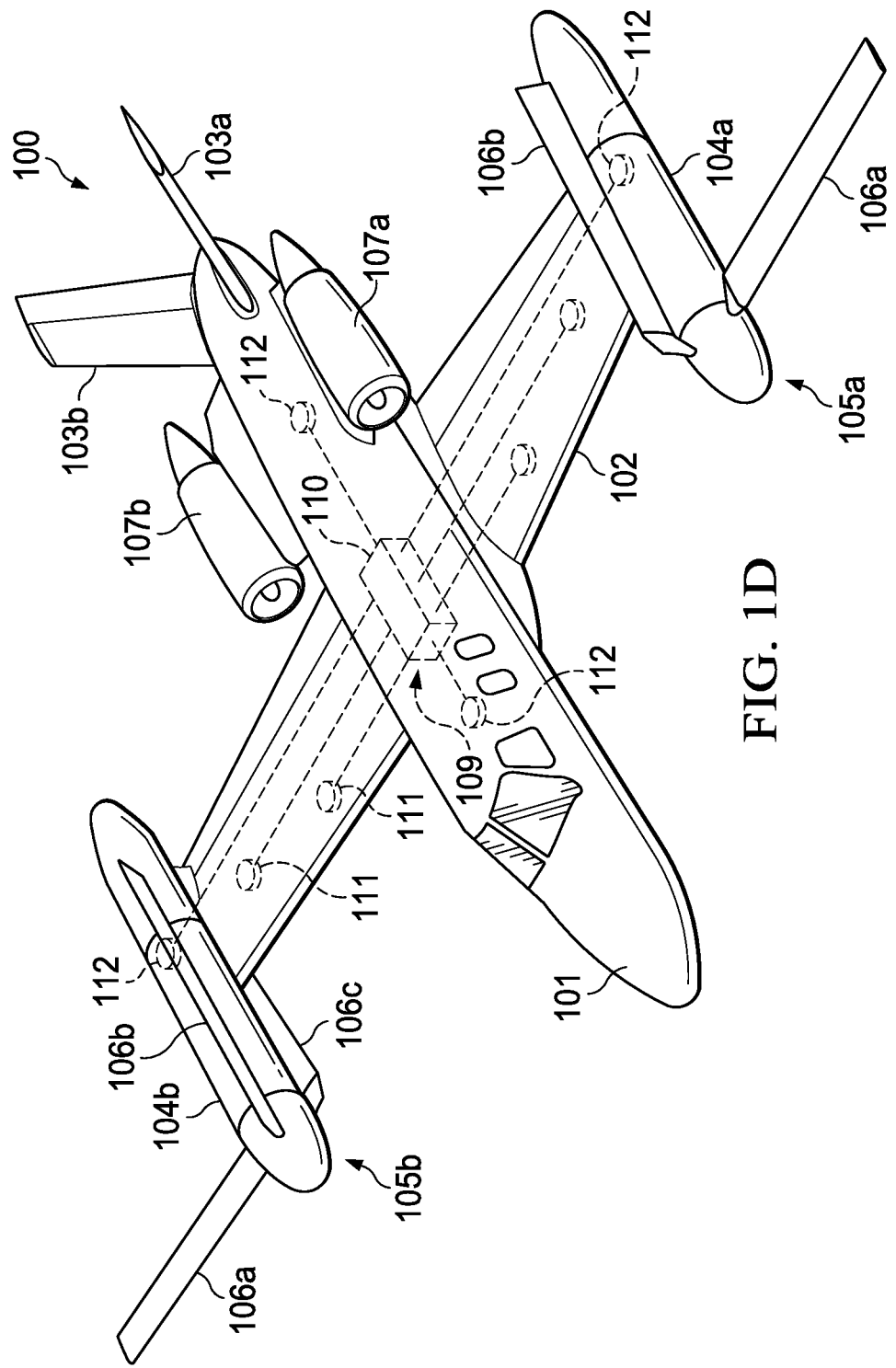

FIG. 1D illustrates the tiltrotor aircraft of FIG. 1C wherein all but one of the proprotor blades on the proprotor assemblies have been folded to be oriented substantially parallel to respective pylon assemblies.

Figure 1E:
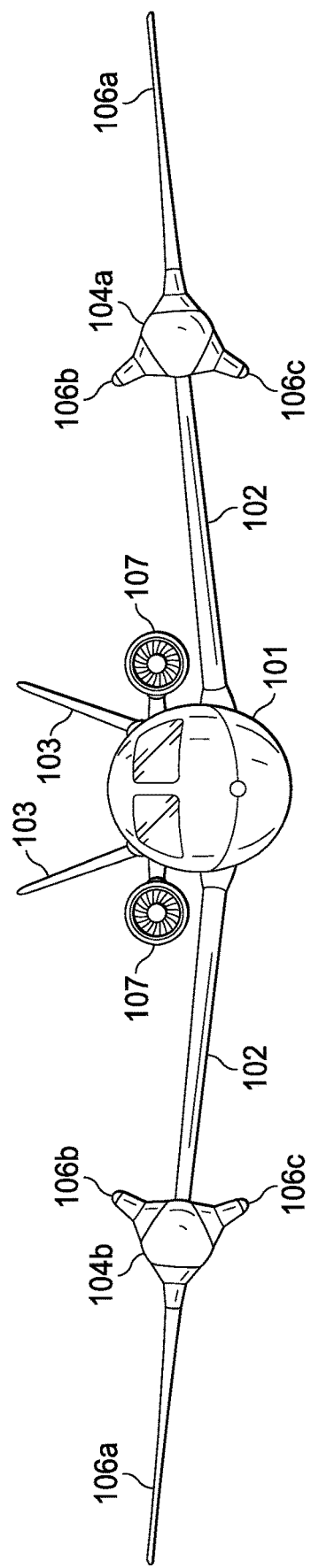

FIG. 1E illustrates a front view of the tiltrotor aircraft of FIG. 1D.

Figure 2A:
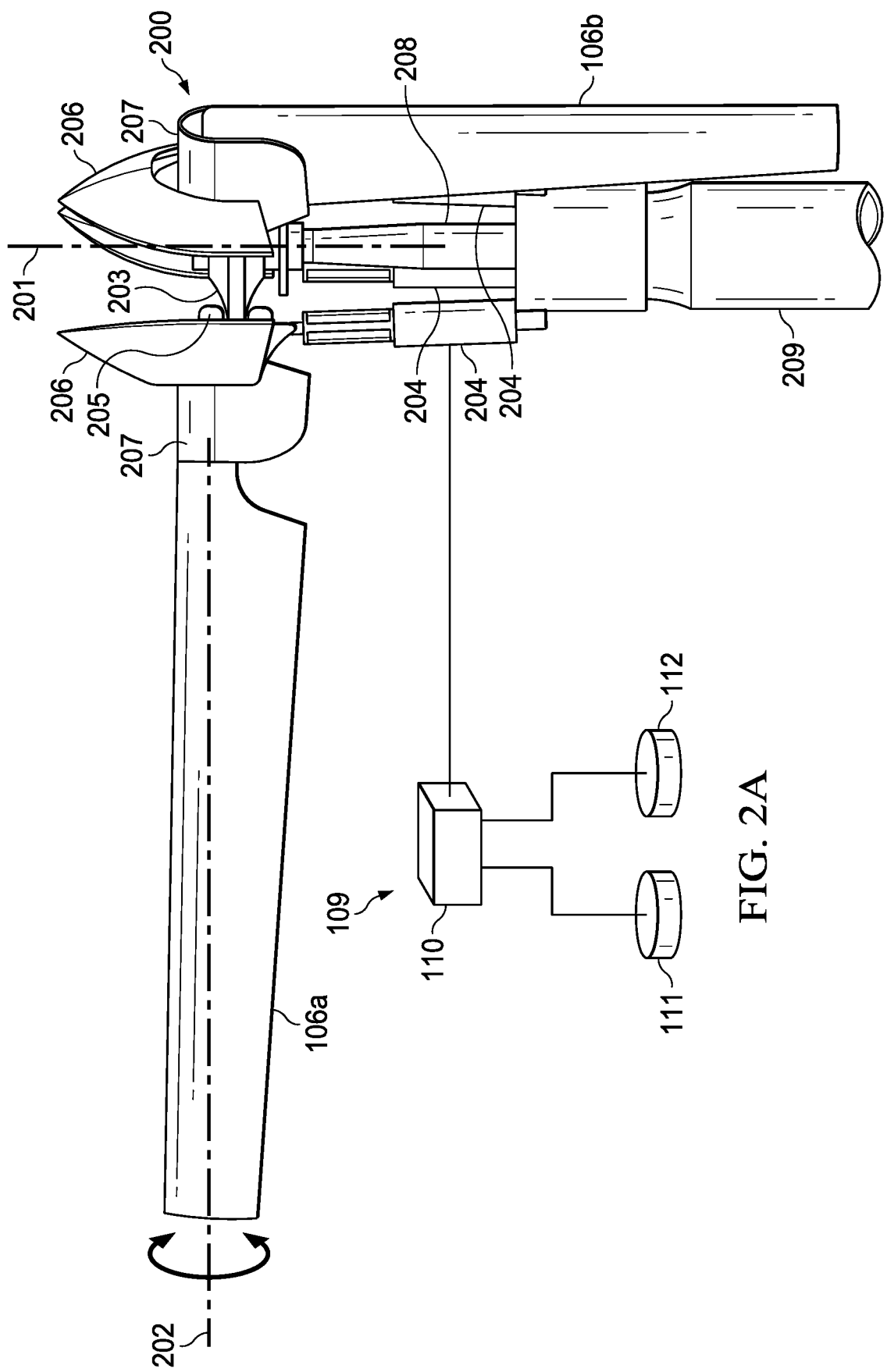
Figure 2B:
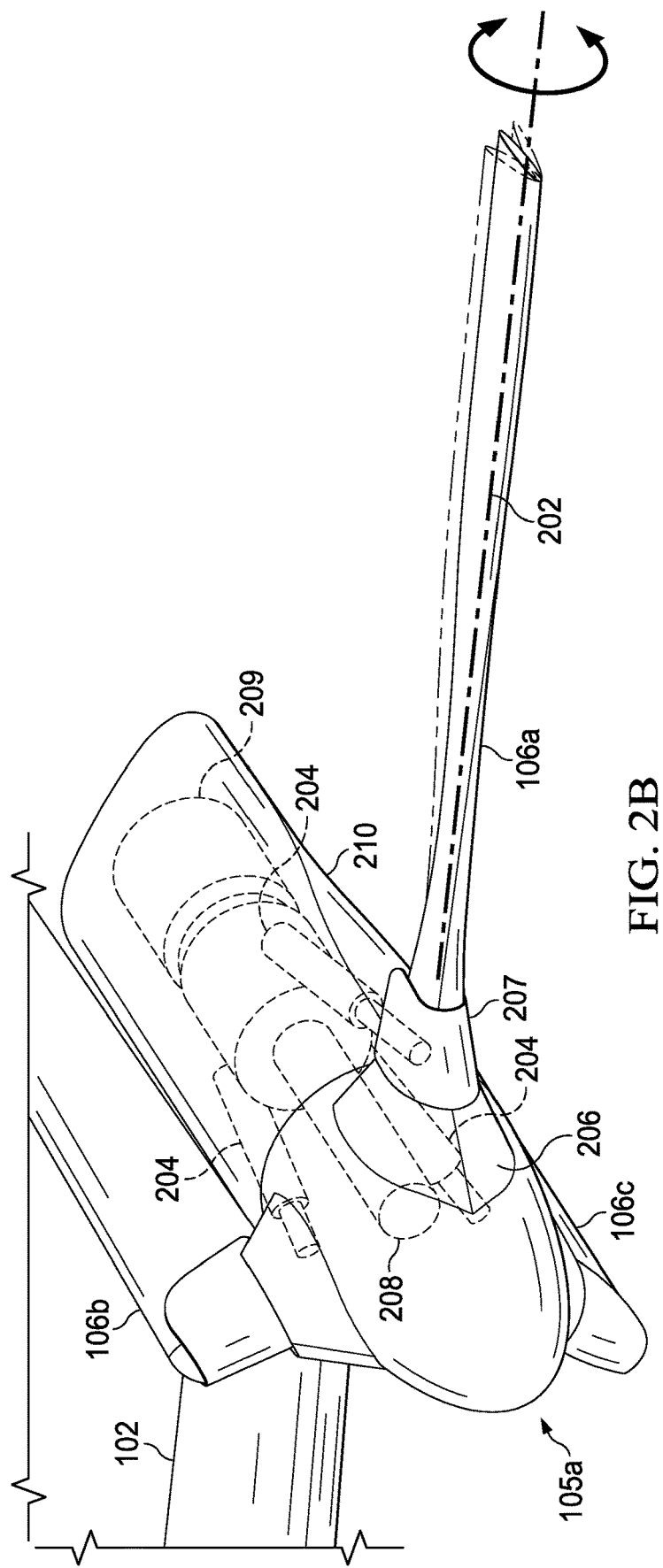
Figure 2C:
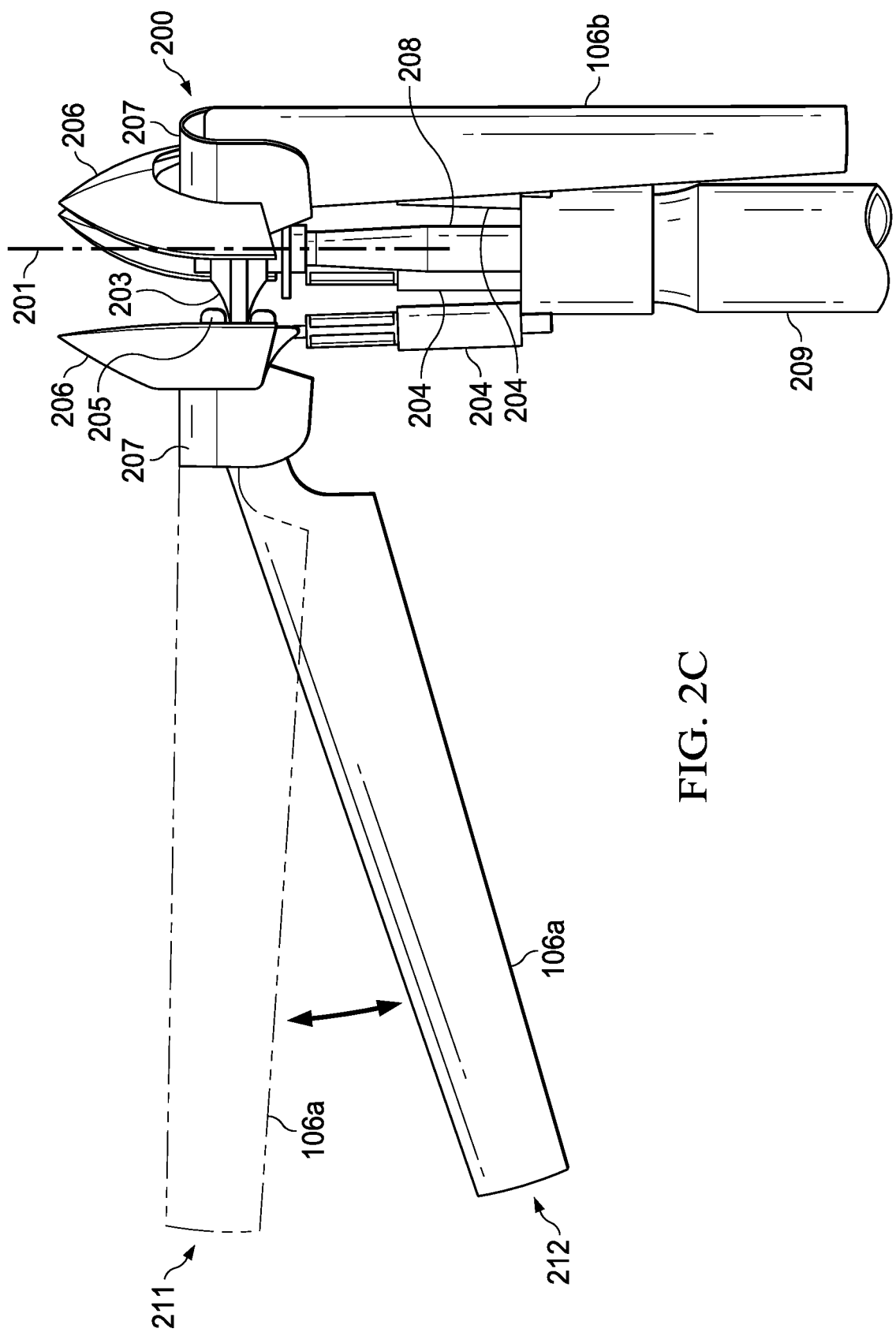

FIGS. 2A-C depict a rotorblade control mechanism for a proprotor assembly, which allows for individual rotorblade control.

Figure 3A:
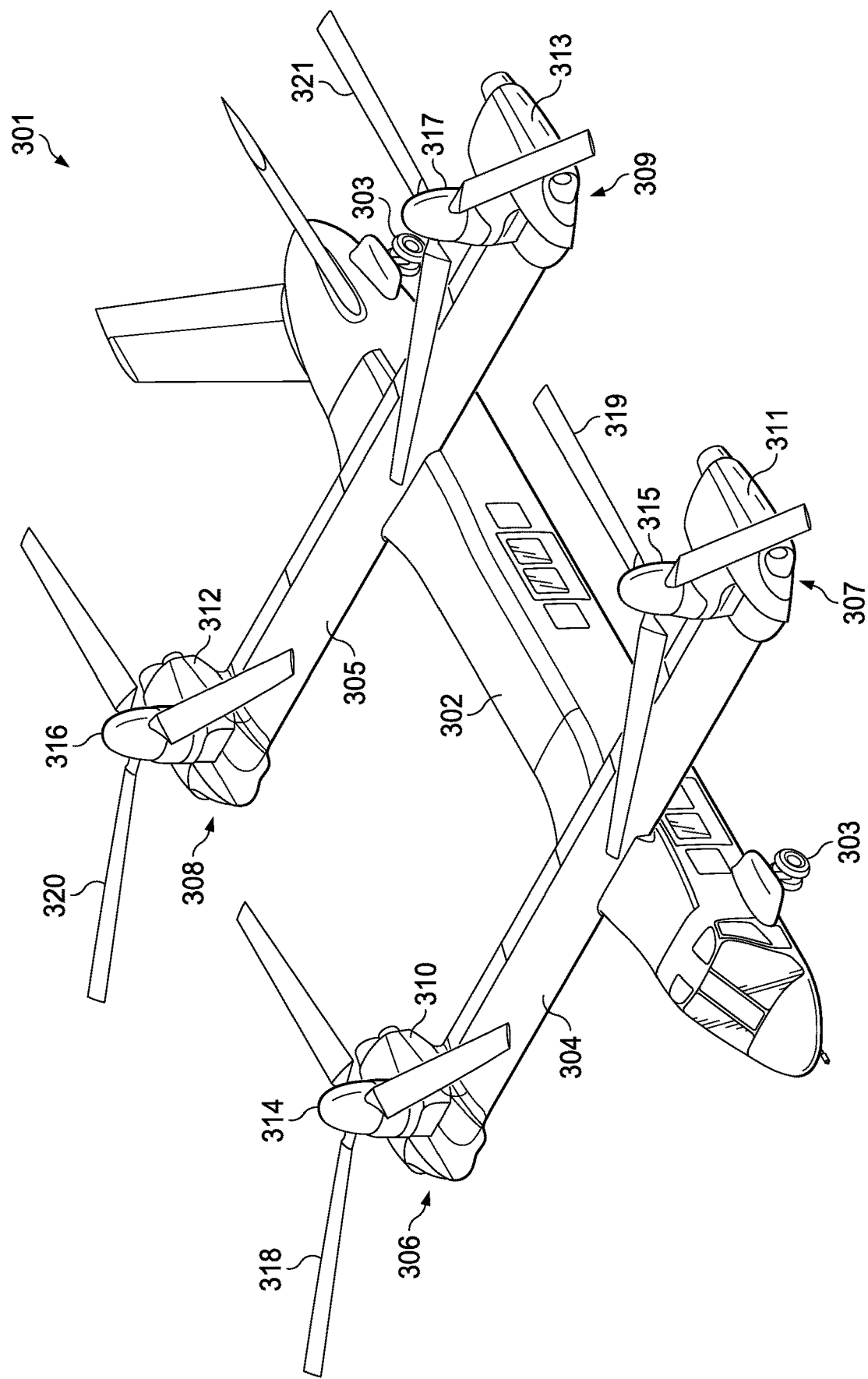

FIG. 3A illustrates a quad tiltrotor aircraft in VTOL or helicopter flight mode.

Figure 3B:
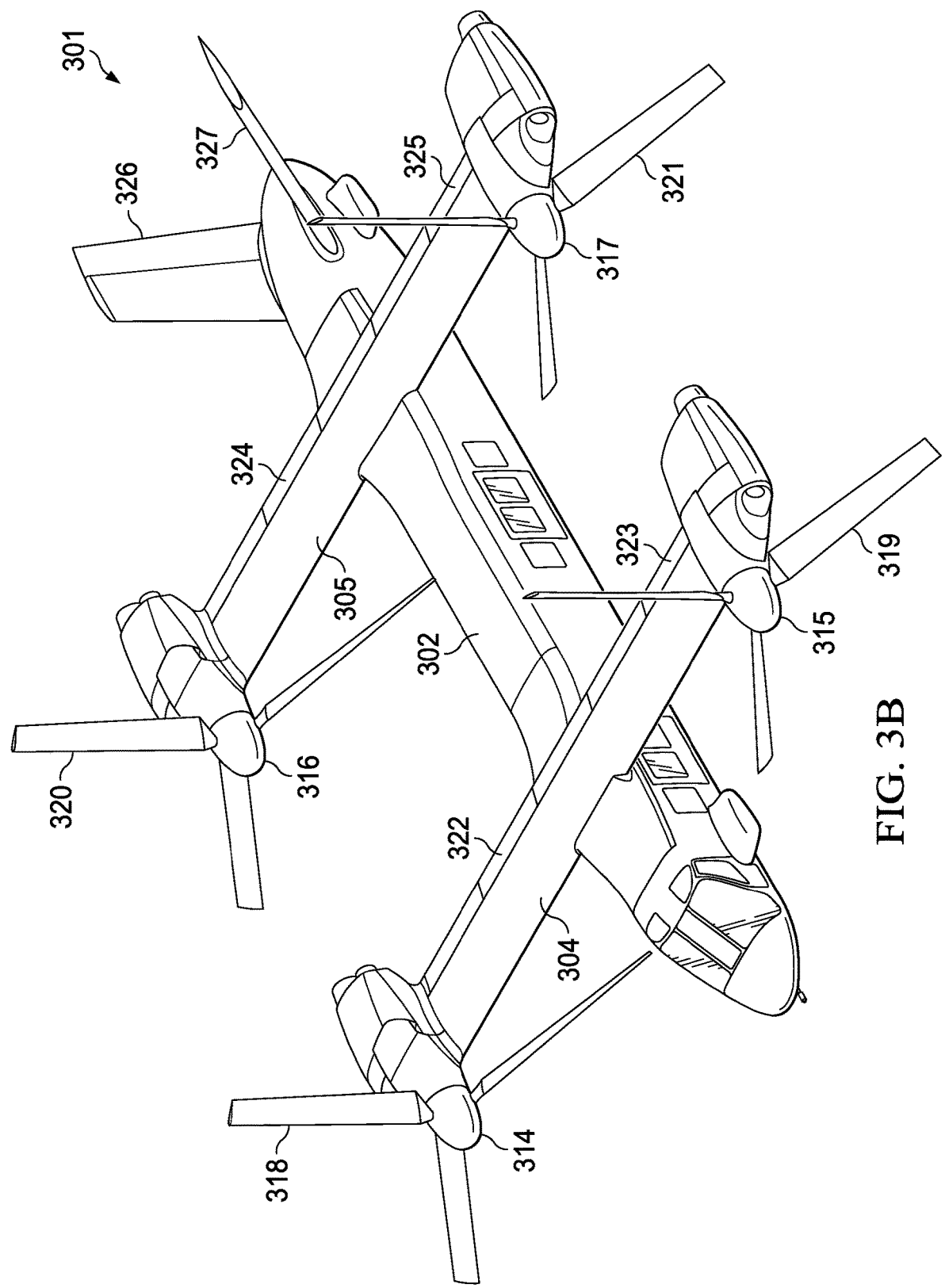

FIG. 3B illustrates the quad tiltrotor aircraft of FIG. 3A in proprotor forward flight mode.

Figure 3C:
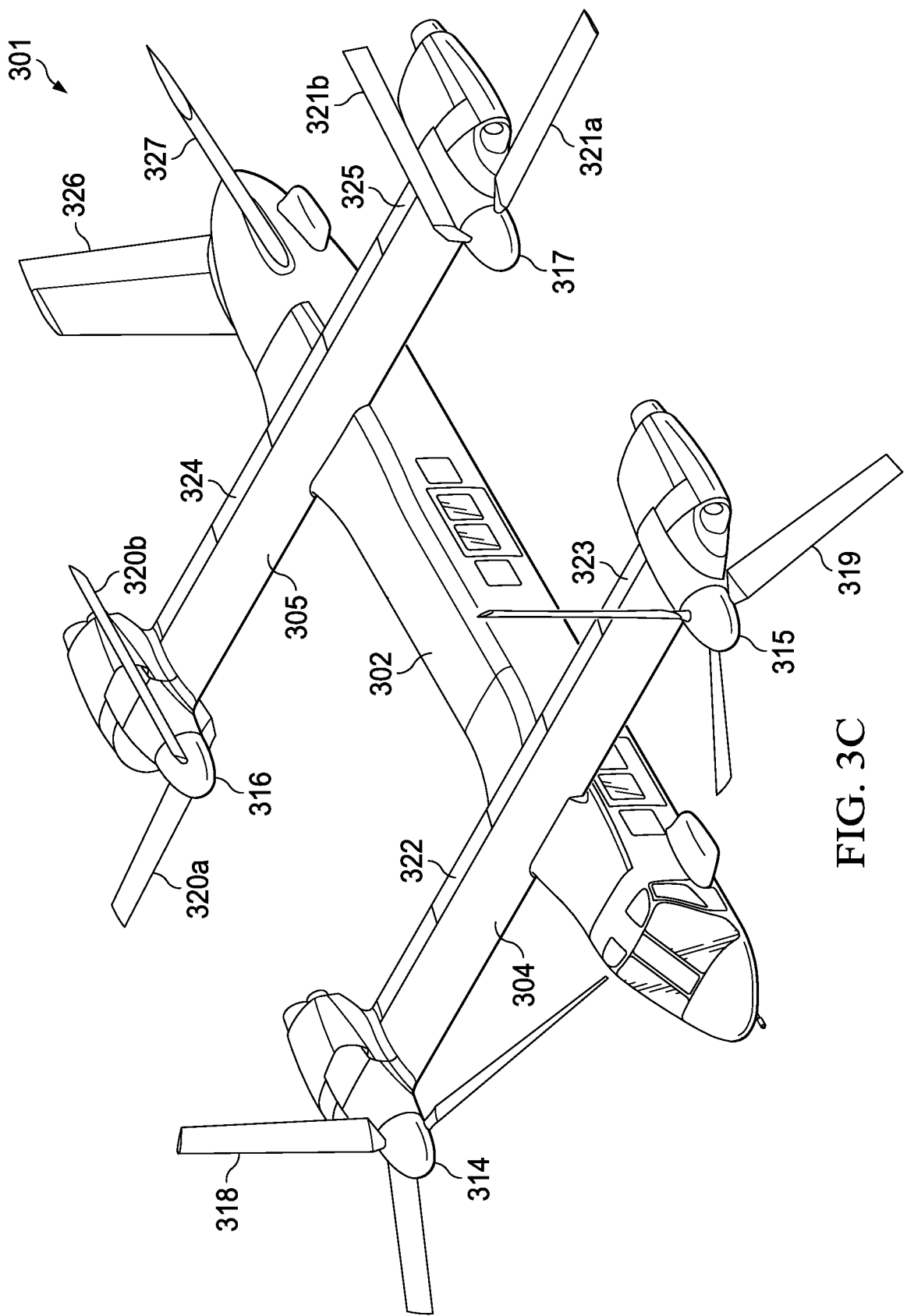

FIG. 3C illustrates the quad tiltrotor aircraft of FIG. 3B wherein all but one of the proprotor blades on two sets of the proprotor assemblies have been folded to be oriented substantially parallel to respective pylon assemblies.

Figure 4A:
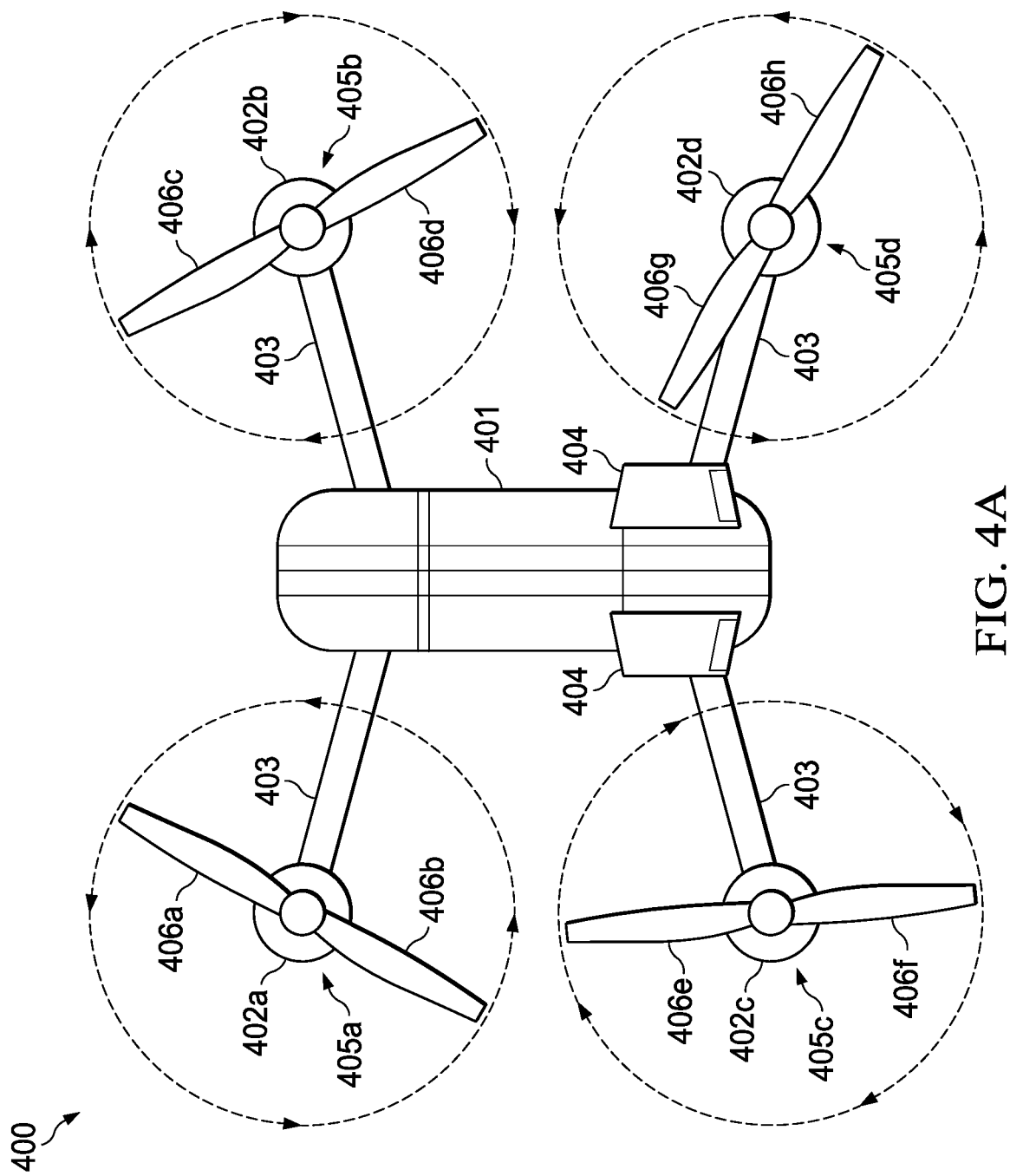

FIG. 4A depicts an unmanned aerial vehicle or drone aircraft adapted for use with the active sail blade technology.

Figure 4B:
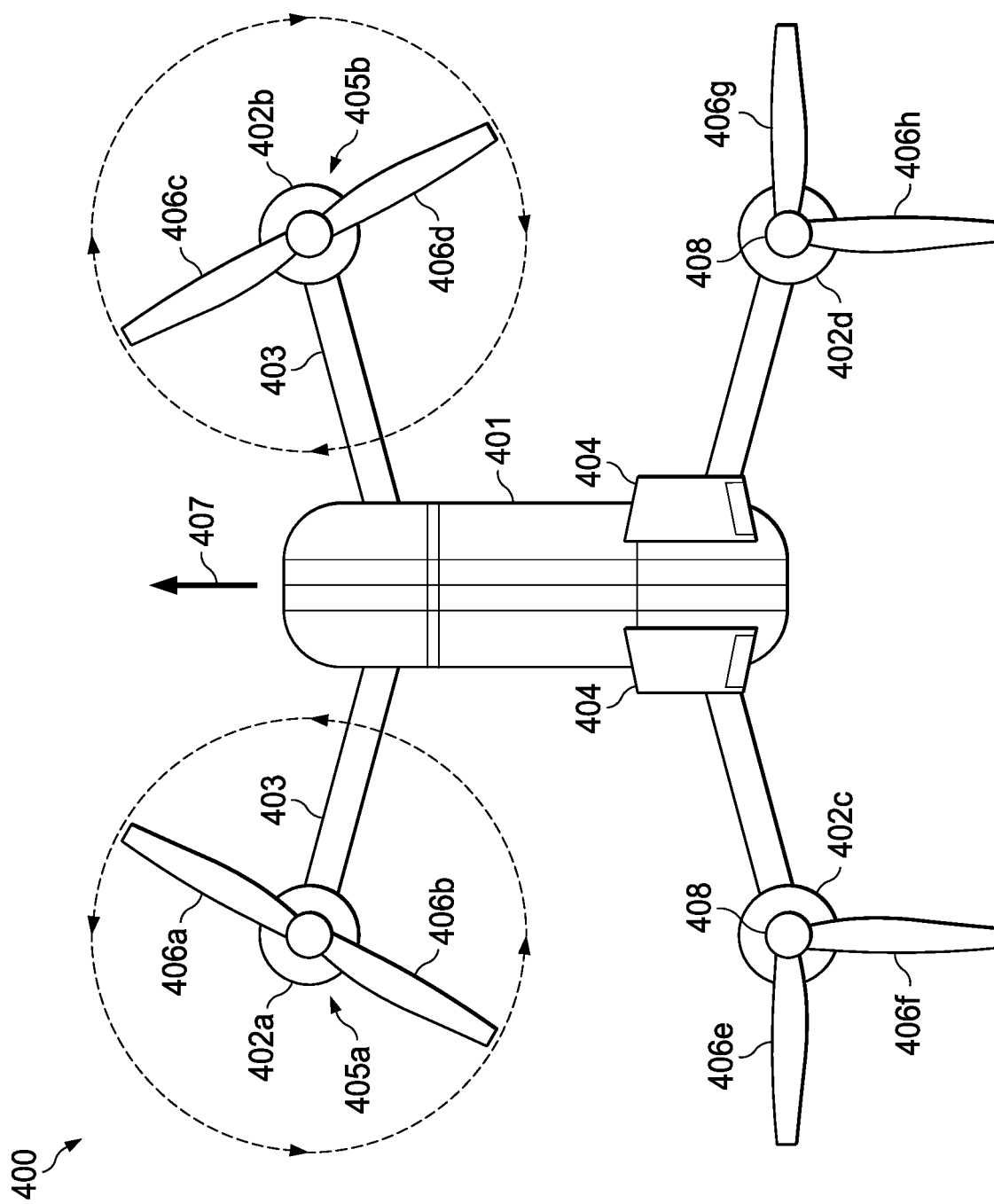

FIG. 4B depicts aircraft the drone aircraft of FIG. 4B in an active sail blade configuration.

Figure 5A:
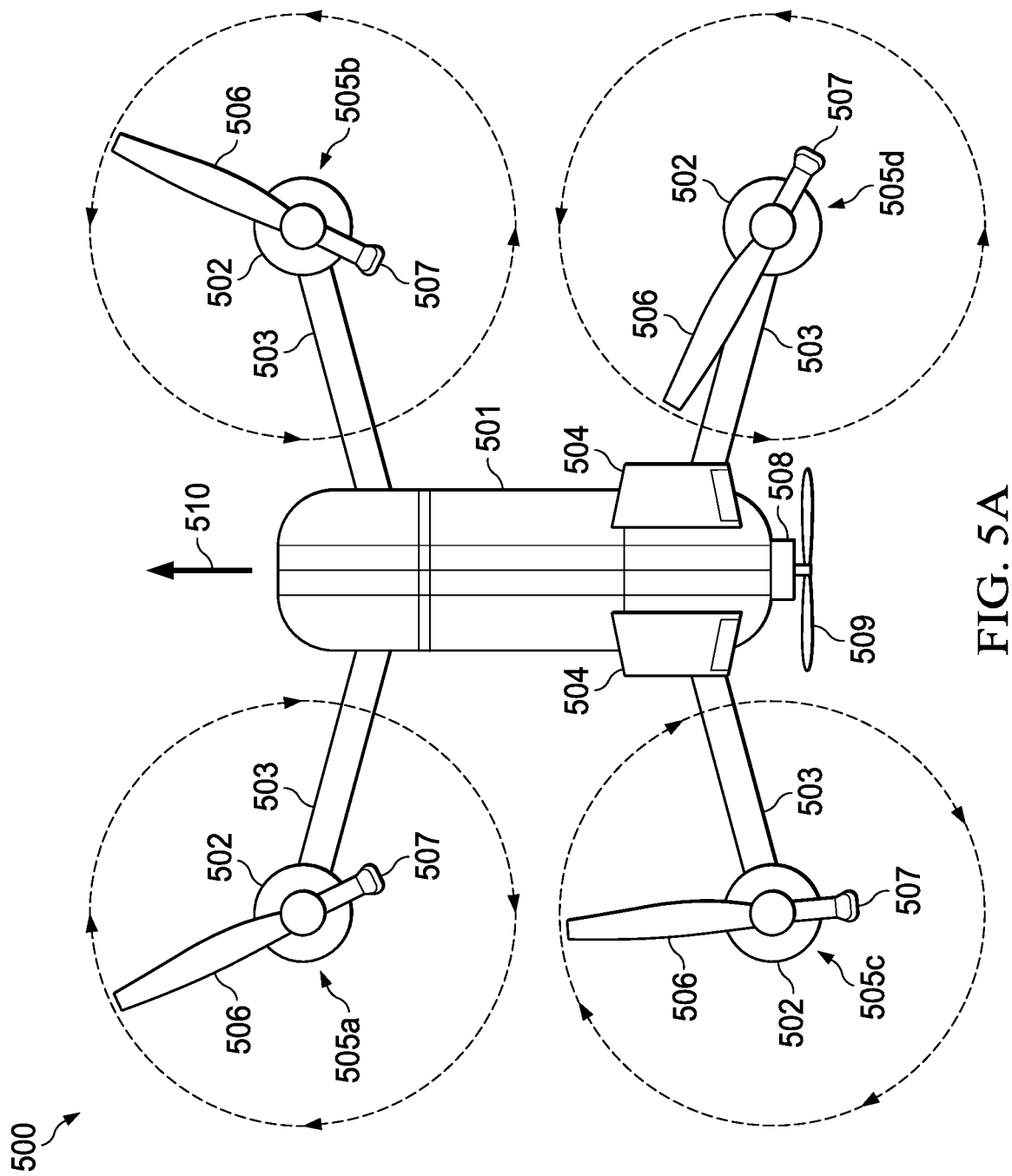

FIG. 5A depicts an unmanned aerial vehicle or drone aircraft adapted for use with the active sail blade technology.

Figure 5B:
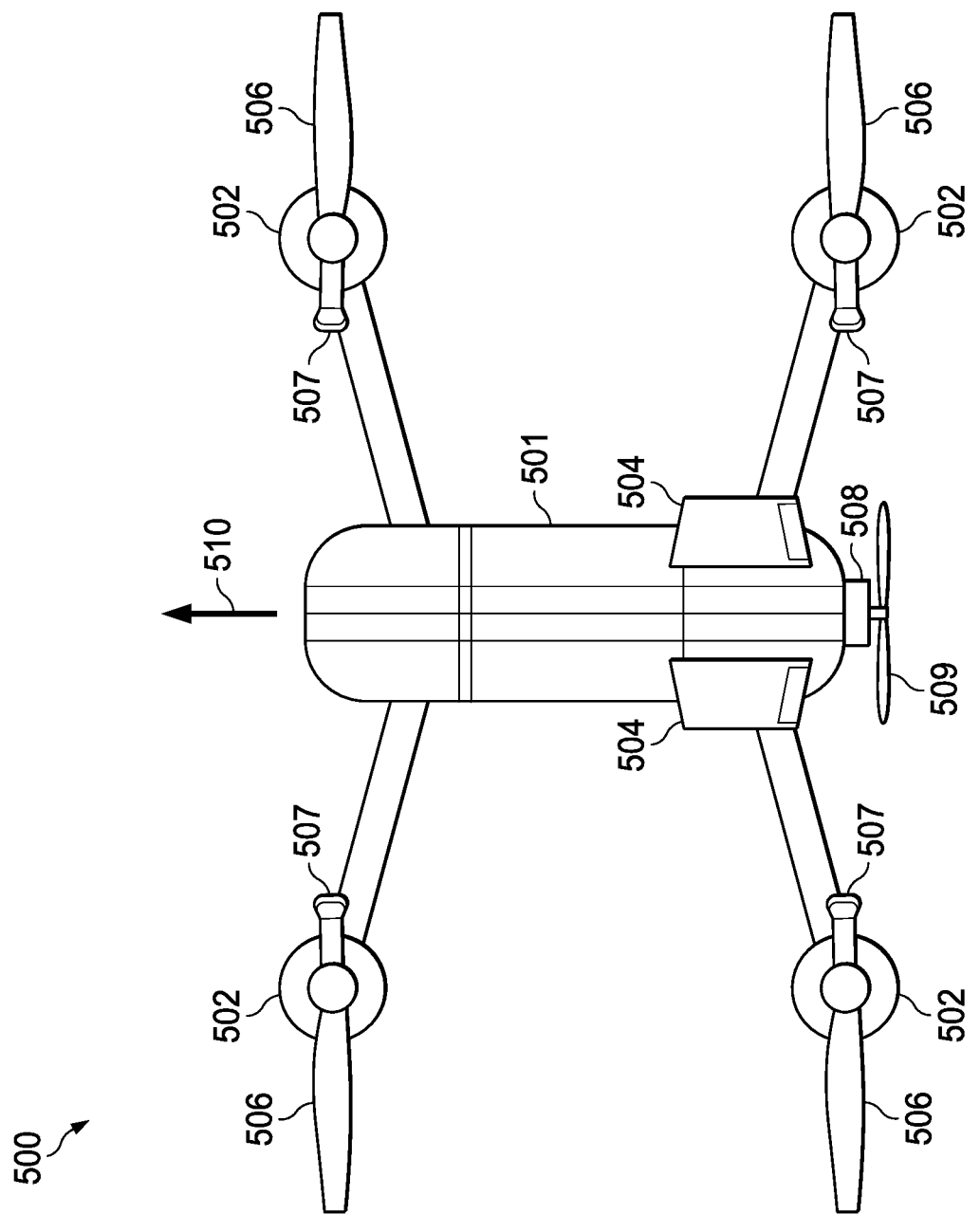

FIG. 5B depicts the drone aircraft FIG. 5A in an active sail blade configuration.

Figure 6A:
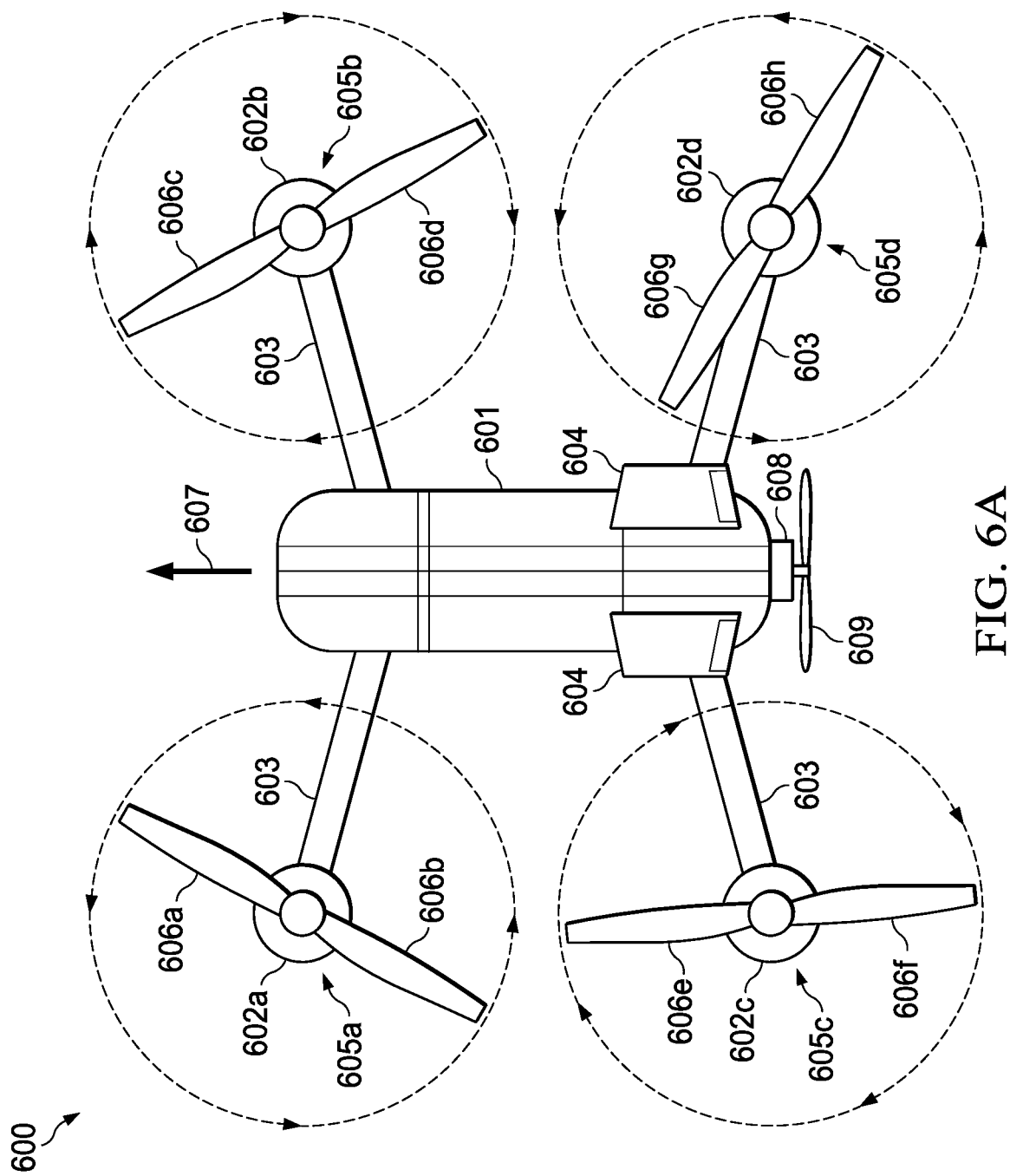

FIGS. 6A and B depict an unmanned aerial vehicle or drone aircraft with a push propeller that is adapted to use the active sail blade technology.

While the system of the present application is susceptible to various modifications and alternative forms, specific embodiments thereof have been shown by way of example in the drawings and are herein described in detail. It should be understood, however, that the description herein of specific embodiments is not intended to limit the system to the particular forms disclosed, but on the contrary, the intention is to cover all modifications, equivalents, and alternatives falling within the spirit and scope of the present application as defined by the appended claims.

DETAILED DESCRIPTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

Referring to FIGS. 1A-1D, a tiltrotor aircraft is schematically illustrated and generally designated 100. Aircraft 100 includes a fuselage 101, a wing 102 and tail assembly 103a, 103b including control surfaces, such as ailerons, flaps, slats, spoilers, elevators, rudders, or ruddervators, operable for horizontal and/or vertical stabilization during forward flight. Pylon assemblies 104a, 104b are located at the outboard ends of wing 102 and are rotatable relative to wing 102 between a generally vertical orientation, as best seen in FIG. 1A, and a generally horizontal orientation, as best seen in FIGS. 1B-1D. Pylon assemblies 104a, 104b may comprise a fixed portion that is attached to wing 102 and a moveable portion that rotates or pivots relative to wing 102, as illustrated in FIG. 1A. In other embodiments, the entire pylon assemblies 104a, 104b may rotate relative to wing 102.

Pylon assemblies 104a, 104b each house a portion of a drive system that is used to rotate proprotor assemblies 105a, 105b, respectively. The drive system may comprise, for example, engines within each of pylon assemblies 104a, 104b. Alternatively, a separate drive system, such as engines 107a, 107b, may be coupled to each of the proprotor assemblies 105a, 105b via linkages in wing 102 and pylon assemblies 104a, 104b. Each proprotor assembly 105a, 105b includes a plurality of proprotor blades 106 that are operable to be rotated (as best seen in FIGS. 1A-1B), operable to be feathered (as best seen in FIG. 1C), and operable to be folded (as best seen in FIG. 1D).

Engines 107a, 107b are located on the aft portion of fuselage 101. Engines 107a, 107b may be operable in a turboshaft mode, as best seen in FIGS. 1A-1B, in which they provide torque and rotational energy to proprotor assembly 105a, 105b, respectively. Alternatively, engines 107a, 107b may be operable in a turbofan mode, as best seen in FIGS. 1C-1D, in which they provide a rearward-directed thrust to propel aircraft 100.

FIG. 1A illustrates aircraft 100 in VTOL or helicopter flight mode, in which proprotor assemblies 105a, 105b are rotating in a substantially horizontal plane to provide a lifting thrust, such that aircraft 100 flies much like a conventional helicopter. In this configuration, engines 107a, 107b are operable in turboshaft mode wherein combustion gases in each engine 107a, 107b cause rotation of a power turbine coupled to an output shaft that is used to power the drive system coupled to the respective proprotor assemblies 105a, 105b. In this configuration, engines 107a, 107b are operable in the turboshaft mode and aircraft 100 is considered to be in the rotary flight mode.

FIG. 1B illustrates aircraft 100 in proprotor forward flight mode, in which proprotor assemblies 105a, 105b are rotating in a substantially vertical plane to provide a forward thrust enabling wing 102 to provide a lifting force responsive to forward airspeed, such that aircraft 100 flies much like a conventional propeller driven aircraft.

In the rotary flight mode of aircraft 100, proprotor assemblies 105*a*, 105*b* rotate in opposite directions to provide torque balancing to aircraft 100. For example, when viewed from the front of aircraft 100 in proprotor forward flight mode (FIG. 1B) or from the top in helicopter mode (FIG. 1A), proprotor assembly 105*a* rotates clockwise, as indicated by motion arrows 108*a*, and proprotor assembly 105*b* rotates counterclockwise, as indicated by motion arrows 108*b*. In the illustrated embodiment, proprotor assemblies 105*a*, 105*b* each include three proprotor blades 106 that are equally spaced apart circumferentially at approximately 120-degree intervals. It should be understood by those having ordinary skill in the art, however, that the proprotor assemblies 105*a*, 105*b* of the present disclosure may have proprotor blades with other designs and other configurations including, for example, proprotor assemblies having four, five or more proprotor blades. In addition, it should be appreciated that aircraft 100 can be operated such that proprotor assemblies 105*a*, 105*b* are selectively positioned between proprotor forward flight mode and helicopter mode, which can be referred to as a conversion flight mode.

FIG. 1C illustrates aircraft 100 in transition between proprotor forward flight mode and airplane forward-flight mode, in which engines 107*a*, 107*b* have been disengaged from proprotor assemblies 105*a*, 105*b* and proprotor blades 106 of proprotor assemblies 105*a*, 105*b* have been feathered (i.e., oriented to be streamlined in the direction of flight), such that proprotor blades 106 act as brakes to aerodynamically stop the rotation of proprotor assemblies 105*a*, 105*b*. In this configuration, engines 107*a*, 107*b* are operable in turbofan mode to create forward thrust enabling wing 102 to provide a lifting force responsive to forward airspeed, such that aircraft 100 flies much like a conventional jet aircraft. Thus, in this configuration, aircraft 100 is considered to be in a non-rotary flight mode.

FIG. 1D illustrates aircraft 100 in airplane forward flight mode, in which proprotor blades 106*b*, 106*c* of proprotor assemblies 105*a*, 105*b* have been folded to be oriented substantially parallel to respective pylon assemblies 104*a*, 104*b*. This configuration minimizes the drag force generated by proprotor blades 106*b*, 106*c*. A single proprotor blade 106*a* on each proprotor assembly 105*a*, 105*b* remains extended outboard of, and generally parallel to, wing 102. In this configuration, proprotor blades 106*a* function as sail blades that increase and extend the total lifting surface, which can increase aircraft 100 range and efficiency.

In this configuration, engines 107*a*, 107*b* are operable in the turbofan mode and aircraft 100 is considered to be in the non-rotary flight mode. The forward cruising speed of aircraft 100 can be significantly higher in airplane flight mode versus proprotor flight mode as the airspeed-induced proprotor aeroelastic instability is overcome.

Aircraft 100 may also transition from the active sail configuration of FIG. 1D back to proprotor flight by slowing below a maximum airspeed for proprotor deployment. Proprotor blades 106*b*, 106*c* may then be swept forward into a feathered configuration matching proprotor blades 106*a*. Once all proprotor blades are deployed forward and locked into place (as illustrated in FIG. 1C), then engines 107*a*, 107*b* may again be engaged with proprotor assemblies 105*a*, 105*b*. When torque power is applied to rotate proprotor blades 106, aircraft 100 enters proprotor forward flight mode. Aircraft 100 may then transition to conversion flight mode and/or helicopter flight mode by rotating proprotor assembly 105*a*, 105*b* on pylon assemblies 104*a*, 104*b* from a horizontal orientation (FIG. 1B) to a vertical orientation (FIG. 1A).

Deploying a single rotorblade on each pylon assembly 104*a*, 104*b* (as illustrated in FIG. 1D) makes aircraft 100 more efficient than either retracting all rotorblades or leaving all rotorblades deployed in a feathered configuration. Additionally, in some embodiments, rotorblade 106*a* may be used as an active sail blade to control both vibration and stability. Active sail blades, such as rotorblades 106*a*, are rotatably coupled to proprotor assembly 105*a*, 105*b* such that the angle of attack between a rotorblade 106*a* and the free airstream can be changed. The addition of active sail blades 106*a* increase the wingspan and aspect ratio of aircraft 100, thereby increasing the efficiency of tiltrotor aircraft 100 in forward flight, including the capability to fly at a higher altitude for longer ranges with the same fuel load. While spinning, proprotor assemblies 105*a*, 105*b* generate rotor wash, which causes download forces on conventional wing extensions. Such download forces can oppose the lift or thrust generated by proprotors 105*a*, 105*b*, thereby lessening their efficiency. In the present disclosure, active sail blades 106*a* are only deployed when proprotors 105*a*, 105*b* are not spinning, which eliminates surfaces that would otherwise be affected by rotor wash. The active sail blades 106*a* may be rotated or articulated into a plurality of streamlined positions relative to the airflow generated by forward movement of aircraft 100.

Aircraft 100 may also transition from the active sail configuration of FIG. 1D back to proprotor flight by slowing below a maximum airspeed for proprotor deployment. Proprotor blades 106*b*, 106*c* may then be swept forward into a feathered configuration matching proprotor blades 106*a*. Once all proprotor blades are deployed forward and locked into place (as illustrated in FIG. 1C), then engines 107*a*, 107*b* may again be engaged with proprotor assemblies 105*a*, 105*b*. When torque power is applied to rotate proprotor blades 106, aircraft 100 enters proprotor forward flight mode. Aircraft 100 may then transition to conversion flight mode and/or helicopter flight mode by rotating proprotor assembly 105*a*, 105*b* on pylon assemblies 104*a*, 104*b* from a horizontal orientation (FIG. 1B) to a vertical orientation (FIG. 1A).

Even though aircraft 100 has been described as having two engines fixed to the fuselage wherein each engine operates one of the proprotor assemblies in rotary flight mode, it should be understood by those having ordinary skill in the art that other engine arrangements are possible and are considered to be within the scope of the present disclosure. For example, in an alternatively embodiment, aircraft 100 may have a single engine that provides torque and rotational energy to both proprotor assemblies 105*a*, 105*b*. In addition, even though proprotor assemblies 105*a*, 105*b* are illustrated in the context of tiltrotor aircraft 100, it should be understood by those having ordinary skill in the art that the proprotor assemblies disclosed herein can be implemented on other tiltrotor aircraft having multiple wing members 102 and other proprotor assembly configurations.

FIG. 1E is a depicts a head-on view of tiltrotor aircraft 100 in the airplane forward flight mode of FIG. 1D. Proprotor blades 106*b*, 106*c* of proprotor assemblies 105*a*, 105*b* have been folded to be oriented substantially parallel to respective pylon assemblies 104*a*, 104*b*. A single proprotor blade 106*a* on each proprotor assembly 105*a*, 105*b* extends outboard and is generally in line with wing 102. Proprotor blades 106*a* function as sail blades that increase and extend the total lifting surface. The pitch and sweep of proprotor blades 106a may also be actively controlled to minimize aircraft vibration or flutter, such as by introducing a dampening force to counter the vibration or flutter. Proprotor blades 106a may further function as flight control surfaces, such as ailerons or flaps in the configuration depicted in FIG. 1E.

The airfoils on rotorblades 106 may be optimized to perform better as static wings than as proprotor blades in order to support the sail blade functionality. This optimization may degrade proprotor efficiency for hover and helicopter mode flight but would improve efficiency for airplane flight mode.

FIG. 2A depicts a rotorblade control mechanism 200 for a proprotor assembly, which allows for individual rotorblade control. A single rotorblade 106a maintains a deployed configuration while all of the other rotorblades 106b,c are retracted to a position flush against the proprotor assembly nacelle (shown as 210 in FIG. 2B). Rotorblade control mechanism 200 decouples the retracted rotorblades 106b,c from control inputs so that the rotorblades 106b,c do not twist or otherwise move while in the stowed position. In one embodiment, pitch links or other actuators (not shown) for the stowed rotorblades 106b,c are detached so that no control inputs are coupled to rotorblades 106b,c. Deployed rotorblade 106a remains coupled to a swashplate assembly 203 via pitch links and/or other actuators to allow for control inputs to be applied to rotorblade 106a.

Rotorblade control mechanism 200 provides primary rotorblade control in VTOL mode. In cruise flight, rotorblade control mechanism 200 controls fold-linkage actuators that are used to retract or deploy rotorblades 106b,c. Blade control actuators 204 and/or swashplate assembly 203 control the position of rotorblades 106 during helicopter flight mode and in VTOL flight. Blade control actuators 204 also provide inputs, such as feathering inputs and harmonic mode control, to deployed rotorblade 106a when it is used as an active sail blade during cruise flight mode.

A hinge assembly 205 allows rotorblades 106 to move between the deployed and stowed positions. Fairing 206 and cowling 207 provide a smooth aerodynamic profile for the deployed and stowed rotorblade positions to reduce aircraft drag.

Drive shaft 208 transfers torque from gearbox 209 to swashplate 203 to rotate rotorblades 106 around axis 201. In one embodiment, gearbox 209 controls the position of rotorblades 106 prior to stowing rotorblades 106b,c. For example, gearbox 209 may rotate drive shaft 208 to a preset position so that rotorblade 106a is generally parallel to the aircraft wing before retracting rotorblades 106b,c. The preset position would further ensure that rotorblades 106b,c may be stowed without impacting the wing, pylon, engine, or other aircraft structure. The swashplate 203, fold-linkage, and/or other actuators may be configured so that a specific rotorblade 106a is always used as the active sail blade. In this configuration, gearbox 209 would always rotate the specific rotorblade 106a to the preset position before rotorblades 106b,c are stowed. Alternatively, rotorblade control mechanism 200 may be configured to allow any rotorblade to function as the active sail blade 106a. In this configuration, gearbox 209 would stop rotation once any rotorblade was in the preset position to operate as deployed rotorblade 106a and the other rotorblades 106b,c would be folded to a stowed position.

The amplitude and frequency of control inputs to the deployed rotorblade 106a may be adjusted or tuned to mitigate undesirable wing and fuselage dynamic modes thereby enhancing aircraft stability. When rotorblades 106b,c are in the stowed position, gearbox 209 may lock drive shaft 208 in place and/or decouple drive shaft 208 from the aircraft power source to prevent further rotation. Alternatively, small movements around axis 201 may be allowed to provide slight adjustments to deployed rotorblade 106a. Additionally, swashplate 203 and blade actuator 204 may adjust the position of rotorblade 106a by rotating it around axis 202 and/or tilting axis 202 (i.e., sweeping rotorblade forward or backward).

FIG. 2B depicts the ability to adjust the feathering of rotorblade 106a by rotating around axis 202. In one embodiment, the pitch of rotorblade 106a is at a set position to operate as a sail blade. In other embodiments, the pitch of rotorblade 106a is continuously or periodically changed to introduce forces that counter aircraft vibration or flutter.

FIG. 2C depicts the ability to adjust the sweep of rotorblade 106a. In one embodiment, rotorblade 106a is fully extended at position 211, which is generally at 90 degrees to the proprotor axis 201. In other embodiments, rotorblade 106a may be sweep backward from the fully extend position to swept position 212. The swept position 212 may be selected to introduce forces that counter aircraft vibration and flutter or to adjust lift and drag forces. The swept position 212 may be fixed or may be continuously or periodically adjusted.

Using rotorblade 106a as an active sail blade provides a number of improvements and benefits. Aircraft loiter efficiency and overall wing efficiency is improved due to the increase in effective wing surface provided by the sail blade. Tuning the active sail blade position (e.g., small corrections to rotational position around axes 201 and 202 and to rotorblade 106a sweep position) provides improved vibrational control and fixed wing flutter control. Flutter occurs as a result of interactions between aerodynamics, stiffness, and inertial forces on aircraft 100. As the speed of aircraft 100 increases, there may be a point at which structural damping is insufficient to damp out motions, such as vibrations, that are due to aerodynamic forces. This vibration can cause structural failure and, therefore, compensation for flutter characteristics is an important consideration for aircraft 100. Flutter may be caused by different modes of vibration in aircraft structures. These modes include, for example, pitch and bending of airfoils, such as tail, propellers and control surfaces such as ailerons, rudders and stabilizers. Pitch mode is rotational motion of an airfoil, and bending mode is vertical (up and down) motion at the tip of the airfoil. At certain airspeeds and/fight conditions, the flutter phenomena can match the natural frequency of aircraft structures. If this flutter is not properly damped, the oscillations can increase in amplitude, leading to structural damage or failure.

Aircraft 100 may have accelerometers or other sensors 111, 112 in the fuselage and/or wing that are used to sense vibrations or other vertical accelerations in flight. The active sail blade 106a may be positioned to counteract such vibrations or unwanted accelerations during flight. Additionally, the active sail blade 106a may be used as an additional flight control surface, such as an aileron, elevator, flap, air brake, or other aerodynamic device. The active sail blade 106a may function as a primary flight control, secondary flight control, or augmented flight control, and may provide vibration control and flutter attenuation.

A conventional rotorblade may be used as an active sail blade 106a; however, in some embodiments, active sail blade 106a may have less twist than a conventional rotorblade. For example, the pitch angle at the tip of the active sail blade may be closer to the pitch angle of the root of the active sail blade when compared to the pitch angle difference across a conventional rotorblade. All rotorblades 106 would have the same design and configuration to ensure balanced operation during rotation to generate proprotor thrust.

Alternative apparatuses for folding rotor blades are disclosed in U.S. patent application Ser. No. 13/576,612, which is now U.S. Pat. No. 8,998,125 B2, U.S. patent application Ser. No. 14/957,321, which is now U.S. Pat. No. 10,336,447 B2, and U.S. patent application Ser. No. 15/428,687, which is now U.S. Pat. No. 10,526,068 B2, the disclosures of which are hereby incorporated herein by reference in their entirety.

Movement of active sail blades 106a (FIG. 1D) may be provided by a blade control actuator 204 (FIG. 2A). In the illustrated embodiments, active sail blades 106a are rotatably coupled to pylon assemblies 104a, 104b. Aircraft 100 may include a feedback control system 109 that includes a feedback loop computing unit 110 and one or more sensors 111 located in wing 102. The sensors 111 may include strain gauges, accelerometers or other sensor types useful in detecting a mode of the structural elements of aircraft 100.

In some embodiments, feedback control system 109 may detect a frequency of the mode of wing 102 and oscillate active sail blades 106a, via blade control actuators 204, at the detected frequency. Specifically, feedback control system 109 may oscillate active sail blades 106a at a different phase angle or opposite the mode of wing 102 to dampen the mode of wing 102, thereby stabilizing aircraft 100. The feedback loop computing unit 110 may be in electrical or hydraulic communication with blade control actuators 204 and be operable to control the movement of active sail blades 106a via blade control actuators 204. The sensors 111 may be in data communication with feedback loop computing unit 110 and be operable to detect one or more stability parameters of wing 102. The feedback loop computing unit 110 may receive the one or more stability parameters from sensors 111. Non-limiting examples of stability parameters include torsion, frequency of vibration, acceleration, structural strain, and structural bending. Such stability parameters are used to determine a mode of wing 102. In other embodiments, additional sensors 112 may be located in any portion of aircraft 100, including pylons assemblies 104a, 104b and/or fuselage 101 so as to detect stability parameters in those elements as well.

The feedback loop computing unit 110 may determine a frequency and a phase angle of the mode of wing 102 based on the stability parameters. The feedback loop computing unit 110 may then send one or more commands to move, or oscillate, active sail blades 106a at a dampening frequency to stabilize tiltrotor aircraft 300. The dampening frequency may be substantially equal to the frequency of the mode of wing 102 and different from the phase angle of the mode of wing 102. This opposite, or counteracting, motion lessens the modal vibrations in wing 102. In some implementations, the dampening frequency at which active sail blades 106a are oscillated may be in a range of approximately 0.5-10 Hz, which in some cases may be the same or similar to the structural mode of vibration of wing 102. By way of specific example for purposes of illustration only, the sensors 111 may detect torsion in wing 102, causing feedback loop computing unit 110 to calculate a 4.2 Hz mode in wing 102. The feedback loop computing unit 110 may then command blade control actuators 204 to drive active sail blades 106a at 4.2 Hz, but in a different phase angle than wing 102, to counteract the torsion forces in wing 102. In embodiments in which the sensors 112 are distributed at other portions of aircraft 100, such as pylon assemblies 104a, 104b and/or fuselage 101, feedback loop computing unit 110 may drive active sail blades 106a to cancel modes in any of these structural elements as well.

FIG. 3A illustrates a multirotor aircraft 301. Multirotor aircraft 301 includes a fuselage 302, landing gear 303, and wings 304 and 305. A propulsion system 306-309 is positioned on both ends of wings 304 and 305. Each propulsion system 306-309 includes an engine 310-313 and a proprotor 314-317, respectively. Each proprotor 314-317 has a plurality of rotor blades 318-321, respectively, associated therewith. During operation, engines 310-313 typically maintain a constant rotational speed for their respective proprotors 314-317. The rotational direction (i.e., clockwise, or counterclockwise) of each proprotor 314-317 may be selected to counteract torque and P-factor. For example, proprotors on the same wing 304, 305 or on the same side of aircraft 301 may rotate in opposite directions. In one embodiment, proprotors 314 and 317 rotate in a counterclockwise direction and proprotors 315 and 316 rotate in a clockwise direction.

The pitch of rotor blades 318-321 can be adjusted to selectively control thrust and lift of each propulsion system 306-309 on multirotor aircraft 301. A collective pitch control allows a pilot, operator, or autopilot to adjust the pitch angle of all the rotor blades on one propulsion system at the same time (i.e., collectively). When a collective input is made to a propulsion system 306-309, all the respective rotor blades 318-321 for that propulsion system change pitch angle equally. As a result, the total lift for the adjusted prop rotor increases or decreases depending upon the amount and direction of the pitch angle change. The collective control may be applied equally or differentially to each propulsion system 306-309 to control the speed and direction of the movement of multirotor aircraft 301. Additionally, or alternatively, cyclic inputs may also be applied to each propulsion system 306-309 to control the speed and direction of the movement of multirotor aircraft 301.

In a hover or level flight, equal pitch adjustments to each set of rotor blades 318-321 would cause multirotor aircraft 301 to climb or descend. Applying differential pitch adjustments to pairs of rotor blades would cause multirotor aircraft 301 to pitch up or down or to roll to one side. For example, increasing the pitch of rotor blades 318 and 319 relative to rotor blades 320 and 321 would cause multirotor aircraft 301 to pitch nose up, while decreasing the pitch of rotor blades 318 and 319 relative to rotor blades 320 and 321 would cause multirotor aircraft 301 to pitch nose down. Similarly, increasing the pitch of rotor blades 318 and 320 relative to rotor blades 319 and 321 would cause multirotor aircraft 301 would roll left, while increasing the pitch of rotor blades 319 and 321 relative to rotor blades 318 and 320 would cause multirotor aircraft 301 to roll left.

After pitching or rolling multirotor aircraft 301, other collective inputs can be applied to put the aircraft in motion. For example, once multirotor aircraft 301 is pitched forward an increase in total lift (i.e., equal collective input to all rotor blades 318-321) would produce an acceleration in the direction of pitch. Yaw on multirotor aircraft 301 can be controlled by applying more lift or thrust to pairs of rotor blades moving in the same direction. For example, increasing the pitch of rotor blades 318 and 321, which move counterclockwise, will result in multirotor aircraft 301 yawing in a clockwise direction. Counterclockwise yaw can be achieved by increasing the pitch of rotor blades 319 and 320.

Although multirotor aircraft 301 is shown in FIG. 3A as having separate engines for each propulsion system 306-309, it will be understood that in other embodiments a single engine may drive two or more proprotors 314-317. For example, an engine (not shown) located in fuselage 302 may drive two or more proprotors 314-317 through a central gearbox and connecting driveshafts. Similarly, an engine in a propulsion system 306-309 may drive its own proprotor plus one or more other proprotors through a cross-drive shaft, such as to transfer power in the case of an engine failure.

It will be further understood that FIG. 3A is just one example of a multirotor aircraft design and that in other designs wings 304 and 305 are not required if the aircraft operates only in a helicopter mode. In other configurations, propulsion systems 306-309 may be part of fuselage 302 or attached to fuselage 302 by spars, struts, or other structures. Moreover, although four proprotors are illustrated in the system of FIG. 3A, it will be understood that multirotor aircraft designs using the improvements disclosed herein may include three or more proprotors in any appropriate configuration.

FIG. 3A illustrates multirotor aircraft 301 in a helicopter mode wherein proprotors 314-317 are positioned substantially vertical to provide a lifting thrust. FIG. 3B illustrates multirotor aircraft 301 in an airplane mode wherein proprotors 314-317 are positioned substantially horizontal to provide a forward thrust. In the airplane mode of FIG. 3B, lifting force is supplied by wings 304 and 305. Control surfaces 322, 323 on wing 304 and/or control surfaces 324, 325 on wing 305 are used to adjust the attitude of multirotor aircraft 301 around the pitch, roll, and yaw axes while in airplane mode. Additional stabilizers or control surfaces 326, 327 may be required when multirotor aircraft 301 in an airplane mode. Control surfaces 322-327 may be, for example, ailerons, flaps, slats, spoilers, elevators, or rudders.

It will be understood that multirotor aircraft 301 may be operated in a conversion mode such that proprotors 314-317 are selectively positioned between the airplane mode of FIG. 3B and the helicopter mode shown in FIG.3A.

FIG. 3C illustrates aircraft 301 in airplane flight mode, wherein rotor blades 320b, 321b of proprotors 316 and 317 have been folded back into a stowed position that is oriented substantially parallel to the nacelle of their associated propulsion systems. A third rotor blade (not shown) on each proprotor 316 and 317 would also be folded to the stowed position. This configuration minimizes the drag force generated by rotor blades 320b, 321b. A single rotor blade 320a, 321a on each proprotor 316 and 217 remains extended outboard of, and generally parallel to, wing 305. In this configuration, rotor blades 320a, 321a function as active sail blades that increase and extend the total lifting surface of aircraft 301.

In this configuration, proprotors 314 and 315 provide forward thrust for aircraft 301. Active sail blades 320a, 321a improve the loiter efficiency and overall wing efficiency of aircraft 301 by increasing the effective wing surface. The pitch, sweep, and rotation relative to wing 305 for active sail blades 320a, 321a may be adjusted to provide improved vibrational and flutter control. Active sail blades 320a, 321a may be positioned to counteract vibrations or unwanted accelerations during flight. Additionally, active sail blades 320a, 321a may be used as additional flight control surfaces, such as ailerons, elevators, flaps, air brakes, or other aerodynamic devices. Active sail blades 320a, 321a may function as primary flight controls, secondary flight controls, or augmented flight controls, and may provide vibration control and flutter attenuation.

FIG. 4A depicts an unmanned aerial vehicle or drone aircraft 400 adapted for use with the active sail blade technology disclosed and described herein. Aircraft 400 may be colloquially known as a "quadcopter," which is a term generally used to refer to a drone aircraft that is controlled by four proprotors. Aircraft 400 comprises a frame 401, which is a main structure or skeleton upon which other aircraft components are attached. Depending upon the use or mission of aircraft 400, frame 401 may include a flight controller, camera, video transmitter, antenna, battery, power distribution board, and/or other components.

Drone aircraft often use lithium polymer (LiPo) batteries because they provide a high energy density and a high discharge rate. The power distribution board distributes power to the aircraft components at the required voltages. The flight controller is the brain of aircraft 400 and has sensors so it can understand how the aircraft is moving. Using the data provided by these sensors, the flight controller calculates how fast each motor 402 should be spinning for aircraft 400 to behave as instructed by an operator via stick inputs on a remote radio transmitter. Electronic speed controllers interpret signals from the flight controller and translate those signals into phased electrical pulses to determine the speed of motors 402. Typically, motors 402 are brushless motors that provide high efficiency and allow aircraft 400 to carry heavy loads.

Motors 402 are attached to frame 401 by wings or spars 403. The motors 402 and spars 403 on aircraft 400 are in an X-shaped configuration. It will be understood that other configurations, such as a T-shape, may also be used. Additionally, it will be understood that the active sail blade technology may be used with any number of motors 402. For example, three motors ("tricopter") may be arranged in a Y-shape configuration on three spars, or six motors ("hexacopter") may be deployed on spars symmetrically spaced 120 degrees apart.

Frame 401 may further comprise flight control surfaces 404, such as ailerons, flaps, slats, spoilers, elevators, rudders, or ruddervators, that provide horizontal and/or vertical stabilization during flight.

Proprotors 405 comprising rotor blades 406 are attached to each motor 402. The rotational direction (i.e., clockwise, or counterclockwise) of each proprotor 405 may be selected to counteract torque and P-factor and to balance forces on aircraft 400. The thrust on each individual motor 402a-d may be varied to affect the pitch, roll, yaw, and horizontal and vertical movement of aircraft 400. In some embodiments, the pitch of each rotor blade 406 is fixed and thrust is adjusted by increasing or decreasing the speed of motors 402. In other embodiments, motors 402 operate at a constant RPM and the pitch of rotor blades 406 is adjustable so that thrust is adjusted by changing the rotor blade pitch.

FIG. 4B depicts aircraft 400 in an active sail blade configuration. Motors 402c and 402d have stopped rotating so that rotor blades 406e and 406g are positioned approximately perpendicular to the flight path 407 of aircraft 400. In this position, rotor blades 406e and 406g can function as active sail blades. Rotor blades 406f and 406h have moved to a trailing position to minimize their aerodynamic effect on aircraft 400. Rotor hubs 408 on motors 402c and 402d may be indexed or otherwise configured to stop rotating so that rotor blades 406e and 406g are in the active sail blade position. If rotor blades 406f and 406h were allowed to remain perpendicular to the free airstream when motors 402c and 402d stop, then those rotor blades would essentially be flying backwards and would likely generate undesirable aerodynamic forces. Rotor hubs 408 may be configured to allow rotor blades 406f and 406h to swing free of motors 402c and 402d when those motors stop rotating.

Rotor blades 406f and 406h will then move to the trailing position due to forces from the free airstream. Alternatively, rotor hubs 408 may be configured to actively move rotor blades 406f and 406h to the trailing position.

Proprotors 405a and 405b on motors 402a and 402b remain in their original configuration when rotor blades 406e and 406g are in the active sail blade position. This allows proprotors 405a and 405b to provide drive and flight control forces. Flight control surfaces 404 and/or rotor blades 406e and 406g control the attitude of aircraft 400 around the pitch, roll, and yaw axes. The active sail blades 406e and 406g operate as flight controls in addition to providing vibration control and flutter attenuation. Additionally, active sail blades 406e and 406g provide lift forces while aircraft 400 moves in the forward direction 407.

Although active sail blades 406e and 406g are shown in a generally perpendicular position relative to the flight path, it will be understood that in other configurations, the active sail blades 406e and 406g may be held at an angle that is swept forward or aft of the perpendicular position. Additionally, if rotor blades 406 have a variable pitch, then the angle of attack of active sail blades 406e and 406g may be further tuned to minimize vibration, flutter, or other undesired forces on aircraft 400.

Motors 402c and 402d may transition back to normal operation by sweeping trailing rotor blades 406f and 406h back to a position that is aligned with rotor blades 406e and 406g and locking the rotor blades in position by hub 408. Motors 402c and 402d may then rotate proprotors 405c and 405d to generate thrust for aircraft 400 drive and flight control forces.

FIG. 5A depicts an unmanned aerial vehicle or drone aircraft 500 adapted for use with the active sail blade technology disclosed and described herein. Aircraft 500 is a quadcopter that has four single-blade proprotors instead of conventional proprotors having two or more rotor blades. Aircraft 500 comprises a frame 501, and motors 502 are attached to frame 501 by wings or spars 503. The motors 502 and spars 503 on aircraft 500 are in an X-shaped configuration. It will be understood that any number of motors 502 in other configurations, such as a T-shape or a Y-shape, may be used in other embodiments. Frame 501 may further comprise flight control surfaces 504, such as ailerons, flaps, slats, spoilers, elevators, rudders, or ruddervators, that provide horizontal and/or vertical stabilization during flight.

Proprotors 505 comprising a single rotor blade 506 and a counterweight 507 are attached to each motor 502. The rotational direction (i.e., clockwise, or counterclockwise) of each proprotor 505 may be selected to counteract torque and P-factor and to balance forces on aircraft 500. The thrust on each individual motor 502 may be varied to affect the pitch, roll, yaw, and horizontal and vertical movement of aircraft 500. In some embodiments, the pitch of each rotor blade 506 is fixed and thrust is adjusted by increasing or decreasing the speed of motors 502. In other embodiments, motors 502 operate at a constant RPM and the pitch of rotor blades 506 is adjustable so that thrust is adjusted by changing the rotor blade pitch.

A push motor 508 drives propeller 509 to generate thrust to move aircraft 500 forward in direction 510.

FIG. 5B depicts aircraft 500 in an active sail blade configuration. Motors 502 have stopped rotating so that rotor blades 506 are positioned approximately perpendicular to the flight path 510 of aircraft 500. In this position, rotor blades 506 can function as active sail blades. Rotor hubs 508 on motors 502 may be indexed or otherwise configured to stop rotating so that rotor blades 506 are in the active sail blade position. Counterweights 507 may then also be positioned perpendicular to the flight path 510. The effect of this positioning for counterweights 507 would depend upon their size and the forces generated by the free airstream. Alternatively, in some embodiments, rotor hubs 508 may also be configured to allow counterweights 507 to swing free of motors 502 when those motors stop rotating, which would allow counterweights 507 to move to a trailing position due to forces from the free airstream.

Motor 508 and propeller 509 provide drive forces to move aircraft 500 forward. Active sail blades 506 provide lift forces while aircraft 500 moves in the forward direction 510. Flight control surfaces 504 and/or rotor blades 506 control the attitude of aircraft 500 around the pitch, roll, and yaw axes. The active sail blades 506 operate as flight controls in addition to providing vibration control and flutter attenuation.

Although active sail blades 506 are shown in a generally perpendicular position relative to the flight path, it will be understood that in other configurations, the active sail blades 506 may be held at an angle that is swept forward or aft of the perpendicular position. Additionally, if rotor blades 506 have a variable pitch, then the angle of attack of active sail blades 506 may be further tuned to minimize vibration, flutter, or other undesired forces on aircraft 500.

FIG. 6A depicts an unmanned aerial vehicle or drone aircraft 600 with a push propeller that is adapted to use the active sail blade technology disclosed and described herein. Aircraft 600 comprises a frame 601 and motors 602 that are attached to frame 601 by wings or spars 603. Motors 602 may be brushless motors that provide high efficiency and allow aircraft 600 to carry heavy loads. The motors 602 and spars 603 on aircraft 600 are in an X-shaped configuration. It will be understood that other configurations, such as a T-shape, may also be used. Frame 601 may comprise flight control surfaces 604, such as ailerons, flaps, slats, spoilers, elevators, rudders, or ruddervators, that provide horizontal and/or vertical stabilization during flight.

Proprotors 605 comprising rotor blades 606 are attached to each motor 602. The rotational direction (i.e., clockwise, or counterclockwise) of each proprotor 605 may be selected to counteract torque and P-factor and to balance forces on aircraft 600. The thrust on each individual motor 602a-d may be varied to affect the pitch, roll, yaw, and horizontal and vertical movement of aircraft 600. In some embodiments, the pitch of each rotor blade 606 is fixed and thrust is adjusted by increasing or decreasing the speed of motors 602. In other embodiments, motors 602 operate at a constant RPM and the pitch of rotor blades 606 is adjustable so that thrust is adjusted by changing the rotor blade pitch.

Additionally, it will be understood that the active sail blade technology may be used with any number of motors 602. Aircraft 600 and rotorblades 606 may operate in an active sail blade configuration (as illustrated in FIG. 4B, for example). Selected motors 602 may stop rotating so that one rotor blade on each motor is positioned approximately perpendicular to the flight path 607 of aircraft 600. In this position, the extended rotor blades function as active sail blades.

Aircraft 600 has a push motor 608 driving propeller 609 that generates thrust to move aircraft 600 forward in direction 607. Propeller blades 609a and 609b may also be used as flight controls and/or to dampen undesired forces acting on the aircraft.

Figure 6B:
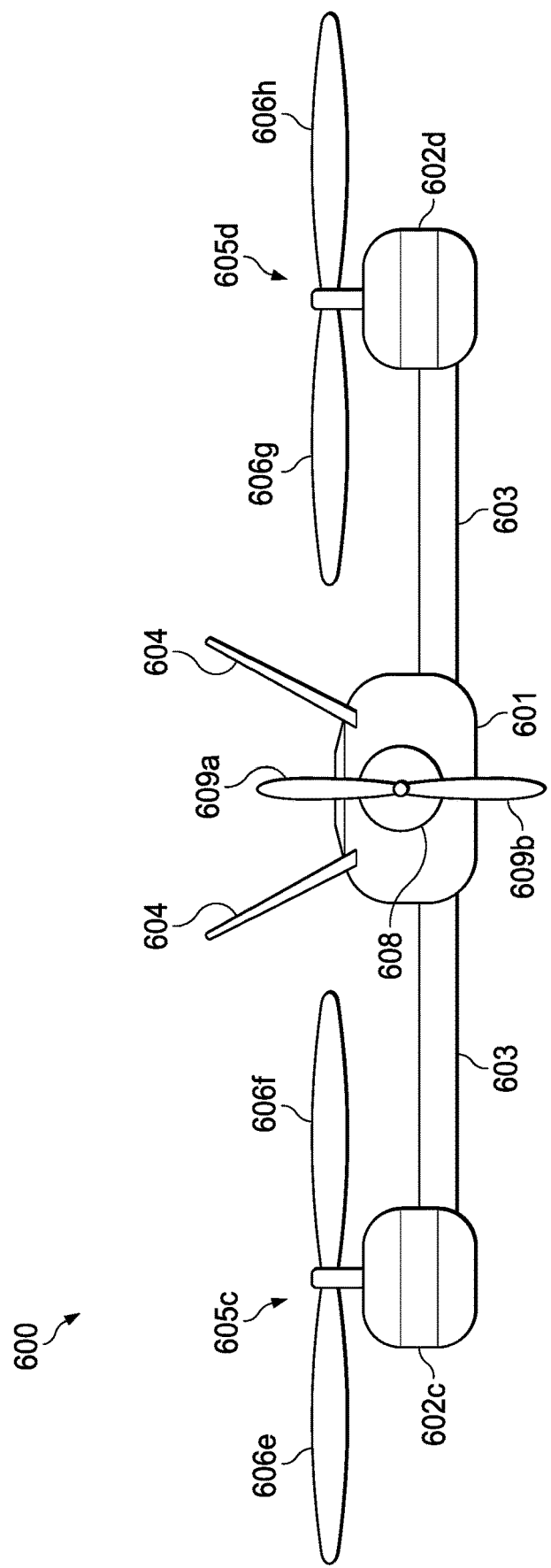

FIG. 6B depicts aircraft 600 with propeller 609 positioned in a flight control configuration. Motor 608 is stopped and propeller 609 is feathered so that propeller blades 609a,b are positioned approximately vertical relative to aircraft 600. In this position, the feathering or pitch of propeller blades 609a,b may be controlled by a rotorblade control mechanism 200 (FIG. 2A) or another independent blade control actuator. As oriented in FIG. 6B, propeller blades 609a and 609b may function as vertical stabilizers and/or rudders. The pitch on either or both propeller blades 609a and 609b may be adjusted to introduce a yawing force on aircraft 600. Alternatively, propeller 609 may be stopped in a horizontal position, which would allow propeller blades 609a and 609b to be used as aileron, flap, elevator, or other flight control surface. In the horizontal, vertical, or other orientation, feathering inputs to propeller blades 609a and 609b may be used to counteract aircraft vibration or other unwanted forces.

In other embodiments, propeller 609 may be mounted on the front of aircraft 600 as a tractor propeller that has the same flight control and/or vibration control functionality. In further embodiments, aircraft 600 may have both push and tractor propellers and either or both of the push and tractor propellers may have flight control and/or vibration control functionality. Although propeller 609 is illustrated as part of a quadcopter drone in the example of FIG. 6A and B, it will be understood that a propeller with flight control and/or vibration control functionality may also be used with manned aircraft.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. An aircraft, comprising:
a fuselage;
a wing attached to the fuselage;
a proprotor assembly having a plurality of rotor blades and mounted on a first end of the wing;
a controller configured to, when the proprotor assembly is not rotating and the aircraft is in flight:
maintain, using a blade actuator, a first of the plurality of rotor blades in an extended position perpendicular to a direction of the flight;
adjust, using the blade actuator, a pitch of the first rotor blade to provide a flight control surface for controlling the direction of the flight of the aircraft, wherein the pitch is adjusted to the exclusion of the other rotor blades;
rotate, using one or more other actuators, the other rotor blades to a folded position parallel to the direction of the flight; and
decouple the other rotor blades from the other actuators so that the other rotor blades do not move while in the folded position.

2. The aircraft of claim 1, wherein the blade actuator is configured to move the first rotor blade when the other rotor blades are in the folded position.

3. The aircraft of claim 2, wherein the blade actuator operates to move the first rotor blade to dampen an undesired force acting on the aircraft.

4. The aircraft of claim 3, wherein the undesired force comprises an aircraft vibration or wing flutter.

5. The aircraft of claim 1, wherein the blade actuator is configured to move the first rotor blade in response to a flight control input from the controller.

6. The aircraft of claim 1, wherein the first rotor blade is configured to operate as at least one of a primary flight control, a secondary flight control, or an augmented flight control when the other rotor blades are in the folded position.

7. The aircraft of claim 1, wherein the first rotor blade is configured to generate a lifting force for the aircraft.

8. The aircraft of claim 1, wherein the proprotor assembly is configured to move between a horizontal position and a vertical position during operation.

9. A tiltrotor aircraft, comprising:
a fuselage;
a wing attached to the fuselage;
a rotor system coupled to a first end of the wing and configured to move between a horizontal position and a vertical position during operation, the rotor system comprising a first rotor blade and one or more additional rotor blades, the rotor system operable to generate thrust when rotating; and
a controller configured to:
when the tiltrotor aircraft is in flight, maintain the first rotor blade in an extended position perpendicular to a direction of the flight;
rotate the additional rotor blades to a folded position parallel to the direction of the flight;
adjust, using an actuator, a pitch of the first rotor blade to provide a flight control surface for controlling the direction of the flight of the aircraft, wherein the pitch is adjusted to the exclusion of the other rotor blades; and
decouple the additional rotor blades from the actuator so that the additional rotor blades do not move while in the folded position.

10. The tiltrotor aircraft of claim 9, wherein the first rotor blade is operable to provide a lift force on the aircraft while in the extended position.

11. The tiltrotor aircraft of claim 9, wherein the controller is configured to move the first rotor blade to counter an undesired force acting on the aircraft.

12. The tiltrotor aircraft of claim 11, wherein the undesired force comprises a vibration or flutter.

13. The tiltrotor aircraft of claim 9, wherein the actuator is configured to move the first rotor blade in response to a flight control input from the controller.

14. The tiltrotor aircraft of claim 9, further comprising:
a feedback loop computing unit in communication with a blade actuator, the feedback loop computing unit operable to control movement of the first rotor blade by the actuator.

15. The tiltrotor aircraft of claim 14, further comprising:
at least one sensor coupled to the aircraft and in data communication with the feedback loop computing unit, the at least one sensor operable to detect at least one stability parameter of the aircraft.

16. The tiltrotor aircraft of claim 15, wherein the feedback loop computing unit is operable to determine a frequency and a phase angle of a mode of the aircraft based on the at least one stability parameter.

17. The tiltrotor aircraft of claim 16, wherein the feedback loop computing unit is operable to send a command to oscillate the first rotor blade at a dampening frequency having substantially the same frequency of the mode of the aircraft and having a different phase angle of the mode of the aircraft.

18. The tiltrotor aircraft of claim 9, further comprising:
a second rotor system coupled to a second end of the wing and configured to move between a horizontal position and a vertical position during operation, the second rotor system comprising a first rotor blade and one or more additional rotor blades and operable to generate thrust when rotating; and
the first rotor blade on the second rotor system configured to remain in an extended position outboard of the wing when the additional rotor blades on the second rotor system rotated to a folded position during the flight.

19. The tiltrotor aircraft of claim 18, further comprising:
a second wing attached to the fuselage;
a third and a fourth rotor system coupled to first and second ends of the second wing, the third and fourth rotor systems configured to move between a horizontal position and a vertical position during operation, the third and fourth rotor systems each comprising a plurality of rotor blades operable to generate thrust when rotating.

* * * * *